United States Patent [19]
Nishitani et al.

[11] Patent Number: 5,711,675
[45] Date of Patent: Jan. 27, 1998

[54] METER MODULE, CONNECTING DEVICE THEREOF, WIRING HARNESS PROTECTOR, AND CONNECTING DEVICE OF INSTRUMENT WIRING HARNESS

[75] Inventors: Keizo Nishitani; Yoshiaki Nakayama; Minoru Kubota; Keiichi Ozaki, all of Shizuoka, Japan

[73] Assignee: Yasaki Corporation, Tokyo, Japan

[21] Appl. No.: 816,886

[22] Filed: Mar. 13, 1997

Related U.S. Application Data

[60] Continuation of Ser. No. 551,511, Nov. 1, 1995, abandoned, which is a division of Ser. No. 209,712, Mar. 14, 1994, Pat. No. 5,615,080.

[30] Foreign Application Priority Data

| Mar. 17, 1993 | [JP] | Japan | 5-57152 |
| Jun. 3, 1993 | [JP] | Japan | 5-133425 |
| Jun. 3, 1993 | [JP] | Japan | 5-133426 |
| Dec. 27, 1993 | [JP] | Japan | 5-333753 |
| Dec. 28, 1993 | [JP] | Japan | 5-334711 |

[51] Int. Cl.⁶ ........................ H01R 33/00
[52] U.S. Cl. ........................ 439/34; 439/248
[58] Field of Search ................ 439/34, 247, 248

[56] References Cited

U.S. PATENT DOCUMENTS

| 4,815,984 | 3/1989 | Sugiyama et al. | 439/34 |
| 4,929,182 | 5/1990 | Hyogo et al. | 439/34 |
| 4,934,961 | 6/1990 | Piorunneck et al. | 439/59 |
| 5,217,386 | 6/1993 | Ohsumi et al. | 439/248 |
| 5,353,190 | 10/1994 | Nakayama et al. | 439/34 |

FOREIGN PATENT DOCUMENTS

| 0 507 225 | 10/1992 | European Pat. Off. | |
| 36 09 704 | 9/1987 | Germany. | |
| 39 03 229 | 8/1990 | Germany. | |
| 41 39 434 | 6/1992 | Germany. | |
| 39 04 734 | 10/1992 | Germany. | |
| 41 21 545 | 1/1993 | Germany. | |
| 43 19 079 | 12/1993 | Germany. | |
| 44 05 083 | 9/1994 | Germany. | |
| 1343481 | 10/1987 | U.S.S.R. | 439/247 |

*Primary Examiner*—Neil Abrams
*Assistant Examiner*—T. C. Patel
*Attorney, Agent, or Firm*—Armstrong, Westerman, Hattori, McLeland & Naughton

[57] ABSTRACT

A meter module includes a meter panel in which meters and indication lamps are mounted, a centralized control circuit board in which control circuits for a vehicle's electrical devices (including meters and indication lamps) are installed, an electric junction box for distribution of power, input and output signals and for integration of earth lines, and a module case. The electric junction box is formed by setting a bus-bar circuit board and an insulator cover in the module case. The electric junction box is formed by setting a bus-bar circuit board and an insulator cover in the module case. The centralized control circuit board and the meter panel are fixed over the electric junction box, whereby the meter panel, the centralized control circuit board and the electric junction box are intensively incorporated. Thus, the electric wiring in the instrument panel portion of the vehicle is simplified and this facilitates setting and assembling of the electric devices such as the meter panel. Furthermore, a wiring harness protector includes a protector main body for protecting a wiring harness therein and a cover. A plurality of through holes are concentrated in the cover, and a plurality of connectors in the wiring harness set in the protector main body are set through the corresponding through holes in a direction perpendicular to the wiring harness extending direction. The connectors are fixed through a connector stopper to form a multipolar connector. The wiring harness protector simplifies the wiring harness, especially the wiring arrangement of instrument panel wiring harness, and facilitates setting and assembling of the wiring harness.

8 Claims, 34 Drawing Sheets

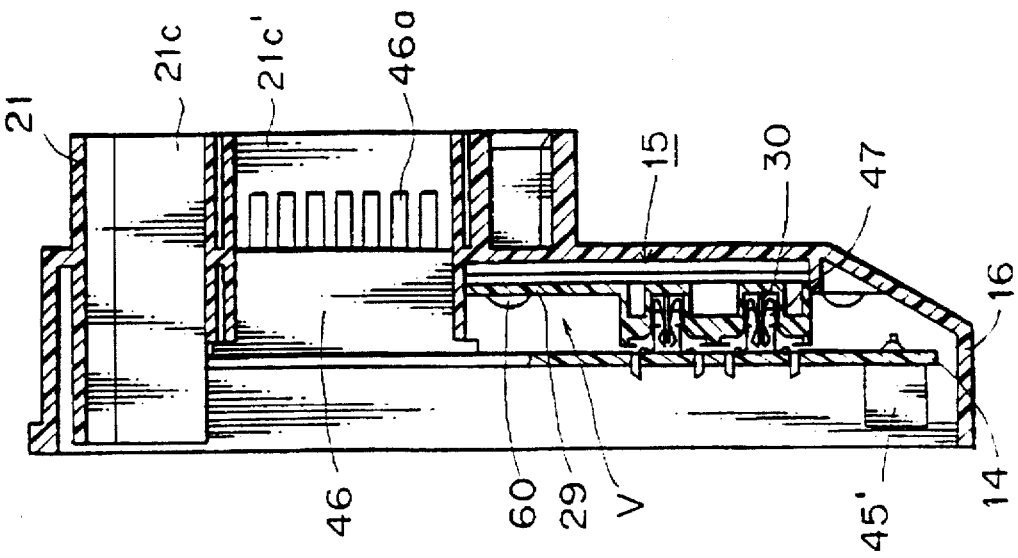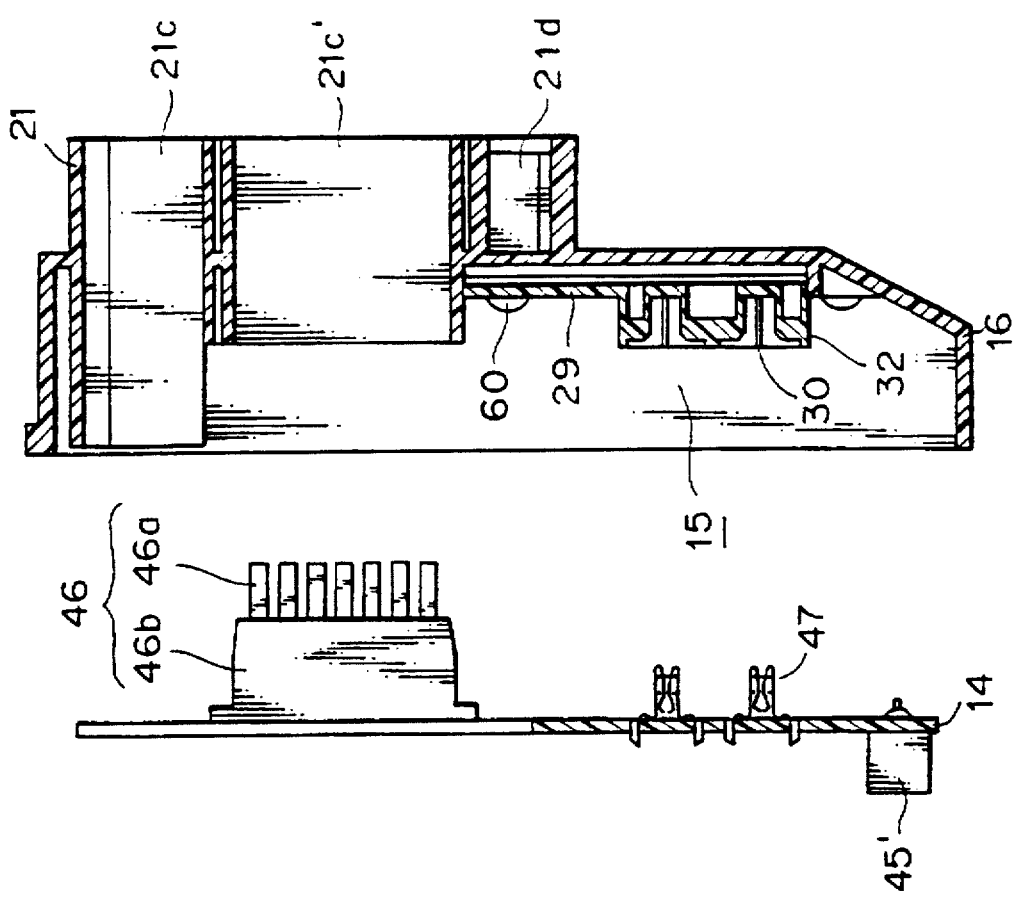

1

METER MODULE, CONNECTING DEVICE THEREOF, WIRING HARNESS PROTECTOR, AND CONNECTING DEVICE OF INSTRUMENT WIRING HARNESS

This application is a continuation application Ser. No. 08/551,511 filed Nov. 1, 1995, now abandoned, which is a Divisional of application Ser. No. 08/209,712, filed on Mar. 14, 1994 which has issued as U.S. Pat. No. 5,615,080.

BACKGROUND OF THE INVENTION

1. Field of the Invention

The present invention relates to a meter module and a connecting device thereof which can facilitate assembling of electric cables and electrical apparatus in an instrument panel portion in a car.

The present invention also relates to a protector suitable for protection and storage of wiring harness arranged for example in an instrument panel portion in a car, and to a connecting device of instrument wiring harness.

2. Related Background Art

There are a number of electric devices, control circuit units for controlling or monitoring them, meters, indicator lamps and switches densely arranged around an instrument panel portion. Thus, the number of electric cables in instrument wiring harness becomes enormous, increasing the volume, the weight and the complexity of wiring. A lot of labor and time is needed for setting of wiring and for connector connection between the harness and the electric devices, and maintenance is very hard.

To relax the situation, Japanese Patent Publication No. 57-38457 describes an idea to simplify the wiring arrangement of wire harness and then to prevent an increase in volume or in weight, in which a plurality of electric junction boxes are scattered in some proper portions in a car, each junction box housing a branch junction portion in wiring harness, a number of fuses as circuit protecting members, and relays as control parts.

FIG. 36 is a wiring diagram for a tail lamp system using such an electric junction box. Reference numeral 1 designates a car body, 91A, 91B tail lamps, 92A, 92B clearance lamps, and 93 an engine. A battery (not shown) is set in an engine room 1A. Arranged around an instrument panel 1B are a meter panel 95 having a tail lamp warning lamp 94, a tail relay 96, an electric junction box 98 provided with a main fuse 97A, a tail fuse 97B and a meter fuse 97C, a lamp breakage inspection relay 99 and a tail switch 100.

When the tail switch 100 is turned on, contacts in tail relay 96 are closed to activate the circuit including the tail fuse 97B so as to light the lamps 91A, 91B, 92A, 92B. If either one of the lamps 91A, 91B is broken, the lamp breakage inspection relay 99 functions to light the warning lamp 94 in the meter panel 95.

FIG. 37 is a block wiring diagram to show the wiring around the meter panel (combination meter) 95 in combination with the electric junction box 98, the lamp breakage inspection relay 99, and the control circuit unit 96 such as a speed control relay and an integration relay as described above.

Mounted in the meter panel 95 are numerous meters 101 such as an oil gauge, a battery indicator, a speedometer, and a tachometer, movements 102 therefor, and lamps 94 for indication, warning or illumination. The speedometer 101A and the tachometer 101B are provided with dedicated control circuits 103A, 103B, respectively. Further, the control circuit units 96 such as the speed control relay and the integration relay are separately arranged. Therefore, the number of power lines and signal lines is still large to connect between the elements. The complexity of wiring will still remain in the arrangement with the limited number of electric junction boxes 98.

Then, Japanese Laid-open Patent Application No. 2-45238 discloses an attempt to further simplify the wiring harness around the instrument panel portion by such an arrangement that an internal circuit in the meter panel is arranged to include a branch circuit having a joint connection portion for connection between the meter panel and the wiring harness, whereby the meter panel takes over a partial role of the branch connection portion in wiring harness to reduce the number of circuits and the number of connection cables inside the electric junction box.

Also, Japanese Laid-open Patent Application No. 4-266537 discloses a circuit structure as shown in FIG. 38. In the circuit structure, switches and meters (not shown) are mounted on a cluster 105 in instrument panel portion 104, a flexible printed-wiring board 106 constituting electric circuits therefor is bonded onto the back face of the cluster, and electronic control boards 109A to 109F, in which electronic functional components 108 such as memories and operational elements necessary for electronic controls of the switches and meters are scattered, are incorporated and connected to terminals of the wiring board 106.

Even if the internal circuit in the meter panel takes over a part of wiring harness or branch circuit of electric junction box, there is a limit on simplification of wiring harness as long as the control circuit units for various electric devices are arranged as separately scattered. Thus, the conventional technology cannot match a further progress in electronization as expected in seeking the safety and the cabin comfortability of car.

Also, when the electric circuits (flexible printed-wiring board) for the switches and meters, and the electronic control boards are arranged as scattered directly on the back face of cluster, a great advantage is present in that the control circuit units are concentrated on the back face of cluster, on one hand. On the other hand, the arrangement has such a technical difficulty that the units must fit in with the shape of recessed or protruded back face of cluster, and the design and production must be changed depending upon the type of car, the grade or a partial change of specifications, resulting in increasing the production cost because of production of small quantity but many types.

Further, the number of electric devices set in the instrument panel portion is still large even in the arrangement that the internal circuit in the meter panel take over a part of wiring harness or branch circuits in the electric junction box, or in the arrangement that the control circuit units are concentrated on the cluster back face by directly scattering the electric circuits (flexible printed-wiring board) for the switches and meters, and the electronic control boards on the back face of cluster. Therefore, the number of branch lines coming from main lines of wiring harness is not so reduced as long as the conventional methods are employed for connector connection between the wiring harness and the electric devices. Thus, a considerable space is necessary for setting the wiring harness, and a lot of labor and time is still necessary for the setting of wiring harness and the connection with the electric devices.

SUMMARY OF THE INVENTION

The present invention has been accomplished taking the above points into account. It is an object of the present invention to provide a meter module and a connecting device thereof which can readily match a difference in type of car or in grade, or an addition of electric device, which can greatly simplify the wiring arrangement around the instrument panel portion, and which can facilitate the wiring and assembling.

It is another object of the present invention to provide a meter module and a connecting device thereof which can keep the control circuit units free of negative influence of electromagnetic waves produced in start or stop of loads such as head lamps and motors.

It is still another object of the present invention to provide a wiring harness protector which can greatly simplify the wiring arrangement of wiring harness, especially of instrument panel harness, and which can facilitate the setting and assembling thereof.

It is still another object of the present invention to provide a connecting device of instrument wiring harness which can facilitate connection with various electric devices set in the instrument panel.

To achieve the above objects, a meter module of the present invention comprises: a meter panel in which meters, indication lamps and wiring circuits therefor are mounted; a centralized control circuit board in which control circuits for car electric devices comprising said meters and indication lamps are set; an electric junction box for distribution of a power supply, an input signal and an output signal to said car electric devices and for integration of earth lines; and a module case for substantially receiving said electric junction box; wherein said electric junction box is so constructed that a bus-bar circuit board and an insulator cover are set in said module case, said bus-bar circuit board comprising a plurality of bus-bars and an insulating base supporting said bus-bars, wherein said centralized control circuit board is fixed on said insulator cover through a spacer, wherein said meter panel is fixed over said centralized control circuit board to said module case, and wherein said electric junction box, centralized control circuit board and meter panel are connected to each other by connector connection.

A meter module further comprises a cluster frame, wherein said meter panel, centralized control circuit board and module case fixedly receiving said electric junction box are set in the cluster frame to form a cluster to be assembled to an instrument panel.

A shield member is interposed between the centralized control circuit board and the electric junction box.

A connecting device for the above meter module comprises: first connecting means for connecting either one of said meter panel, centralized control circuit board and electric junction box to an instrument wiring harness; and second connecting means for connecting said electric junction box to a sub-wiring harness mainly composed of power lines;

wherein said sub-wiring harness takes over a part of circuits for power lines between said instrument panel wiring harness and said electric junction box by connecting said electric junction box to said sub-wiring harness through said second connecting means.

One end of cables constituting said sub-wiring harness may be connected directly with bus-bars inside said electric junction box by press-contact connection. Also, a shield member may cover a part of the electric cables.

The meter module of the present invention is so arranged that the centralized control circuit board, the electric junction box and the meter panel are intensively incorporated in the module case, which is convenient in handling. The assembling is also easy, because the mutual electric connection is made by fitting of male and female connectors. Further, since multiple signal lines are employed for mutual connection of signal lines among the centralized control circuit board, the meter panel and the electric junction box, an additional electric device or control circuit unit thereof can be readily set. In addition, the position of electric junction box is shifted away from the assembling position of centralized control circuit board, utilizing the module case, which can prevent heating of the electric junction box upon current flow from negatively affecting the centralized control circuit board.

In case the meter module is formed as a cluster, the cluster can be set and fixed on the instrument panel to complete setting, which requires no troublesome wiring operation with complicated electric cables (wiring harness). In case the shield member is interposed between the centralized control circuit plate and the electric junction box, the centralized control circuit board can be protected from negative influence of heating or electromagnetic waves produced upon use of load such as a head lamp.

The connecting device of meter module of the present invention employs a separate sub-wiring harness mainly composed of power lines in addition to the connecting means between the meter module and the instrument panel wiring harness. This arrangement decreases the number of branch circuits incorporated in the electric junction box, thus simplifies the structure of the electric junction box itself, and decreases negative effect of temperature rise upon current flow on the control circuits by the external setting of power lines. Further, if the one end of cables constituting the sub-wiring harness are directly connected by press-contact connection with the bus-bars in the electric junction box, the sub-wiring harness can be produced together with the electric junction box in the production line of electric junction box. Also, in assembling the meter module to the cluster frame, the sub-wiring harness can be set and fixed to the cluster frame from the front side thereof. In case the shield member covers a part of the sub-wiring harness directly connected to the bus-bars, the centralized control circuit board can be protected from the negative effect of heating or electromagnetic waves as described above.

To achieve the above objects, a wiring harness protector of the present invention comprises a protector main body for protecting a wiring harness therein and a cover thereof; wherein a plurality of through holes are concentrated in said cover; wherein a plurality of connectors in said wiring harness set in said protector main body are set through said corresponding through holes in a direction perpendicular to an extending direction of said wiring harness; and wherein said connectors are fixed by a connector stopper to thereby form a multipolar connector.

In case a plurality of multipolar connectors are set in the cover, at least one of them is preferably arranged as movable. The multipolar connector may be arranged as movable in the X and Y directions relative to the cover surface. Also, the multipolar connector may be arranged as movable in the Z directions relative to the cover surface.

The wiring harness protected in the protector is suitably used as an instrument wiring harness having a plurality of connectors to be connected to various electric devices such as a meter panel set in an instrument panel portion of car, a centralized control circuit board in which control circuits for car electric devices comprising meters and indication lamps in said meter panel are installed, and an electric junction box for distribution of power supply, input and output signals to said car electric devices and for integration of earth lines.

It is preferred that said plurality of connectors in said multipolar connector comprise a connector connected to a printed-wiring board set on a back face of said meter panel, that said connector has a housing with an internal side wall thereof being open and with an elastic contact piece of a connector terminal being exposed to the opening portion, and said elastic contact piece surface-contacts a circuit connection portion of said printed-wiring board.

A connecting device is for connection between electric devices and an instrument wiring harness having a plurality of connectors to be connected with said electric devices, said electric devices being a meter panel set in an instrument panel portion of car, a centralized control circuit board in which control circuits for car electric devices comprising meters and indication lamps in said meter panel are installed, and an electric junction box for distribution of power supply, input and output signals to said car electric devices and for integration of earth lines; wherein said connecting device has a wiring harness protector comprising a protector main body and a cover thereof, a plurality of through holes are concentrated in said cover, said plurality of connectors in the instrument wiring harness are set through said corresponding through holes in a direction perpendicular to an extending direction of said instrument wiring harness, and said connectors are fixed by a connector stopper to form a multipolar connector; and wherein said electric junction box, centralized control circuit board and electric junction box are intensively incorporated in a module case to form a meter module, and said module case is provided with instrument wiring harness connection connectors intensively arranged corresponding to said plurality of connectors constituting said multipolar connector.

In the wiring harness protector of the present invention, the main cables of wiring harness and a plurality of branch cables therefrom all are set and protected in the assembly of protector main body and cover, and the terminal connectors of branch cables in the harness are gathered as the multipolar connector using the through holes in the cover.

Accordingly, mounting of wiring harness can be made by assembling and fixing the wiring harness protector at a predetermined position, which is very simple. The corresponding connectors of electric devices to be connected to the terminal connectors are preliminarily concentrated corresponding to the multipolar connector, whereby the electric connection of various electric devices can be performed by connector connection at the same time as the mounting of wiring harness.

If at least one of plural multipolar connectors is arranged as movable (in the X and Y directions relative to the cover surface), the connectors are self-aligned with the pitch of corresponding connectors of the electric devices, which is easy in connection and requires no high-precision finish of connector pitch. Further, if a plurality of multipolar connectors are arranged as slidably back and forth relative to the cover surface, the mounting of wiring harness protector can be made in two steps of temporary fixation and final fixation, improving mounting operability.

Applying the protector to the instrument panel harness, the wiring arrangement can be greatly simplified, and setting and assembling operations become easy around the instrument panel portion in which various electric devices are concentrated.

If the wiring harness protector is so arranged that said plurality of connectors in said multipolar connector comprise a connector connected to a printed-wiring board set on a back face of said meter panel, that said connector has a housing with an internal side wall thereof being open and with an elastic contact piece of a connector terminal being exposed to the opening portion, and that said elastic contact piece surface-contacts a circuit connection portion of said printed-wiring board, the elastic contact piece of the connector terminal is protected to the outside, preventing a damage or breakage due to contact or collision with other devices.

Since the connecting device of instrument wiring harness of the present invention is so arranged that electric devices such as the meter panel, the centralized control circuit board and the electric junction box set in the instrument panel are intensively incorporated as a meter module and that the module case is provided with in-pane harness connection connectors concentrated corresponding to the connectors constituting the multipolar connector, the arrangement of wiring harness and the connection of various electric devices are finished in a single mounting operation by assembling and fixing the protector with the instrument panel harness therein to the instrument panel.

Further objects and advantages of the present invention will be apparent from the following description of the preferred embodiments of the invention as illustrated in the accompanying drawings.

BRIEF DESCRIPTION OF THE DRAWINGS

FIG. 8A and FIG. 8B are enlarged cross sectional views to show a separate state and an assembled state, respectively, of centralized control circuit board and electric junction box;

DESCRIPTION OF THE PREFERRED EMBODIMENTS

Figure 1:
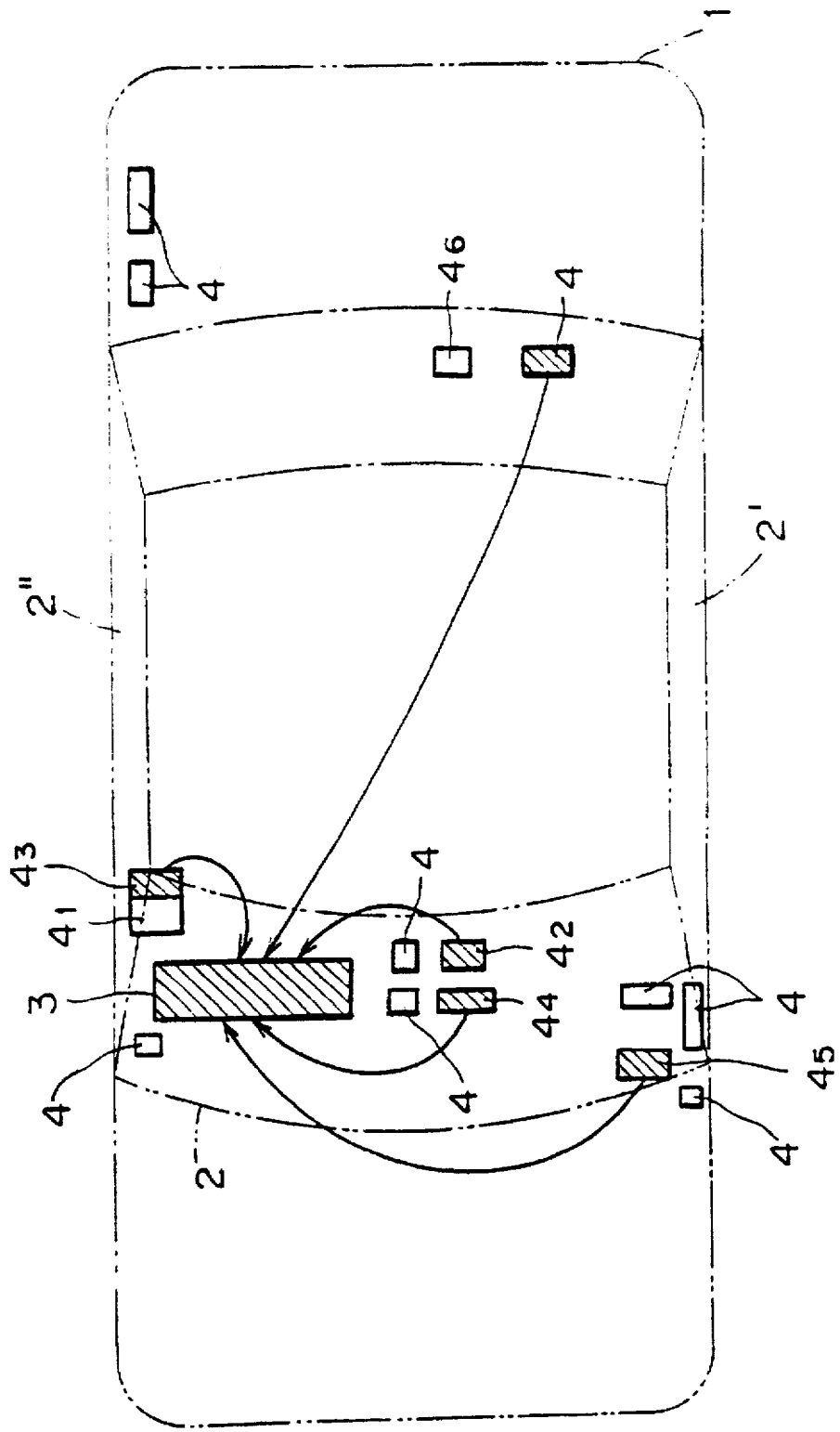
FIG. 1 is an explanatory drawing to show the structure and function of a meter module of the present invention.

FIG. 1 is an explanatory drawing to show the structure and function of a meter module according to the present invention. A meter module 3 is set inside an instrument panel 2 in a car body 1. There are a main electric junction box $4_1$, a sub-electric junction box $4_2$, an integration module $4_3$, relays, unit controls and modules such as a starter interrupt relay, an electronic flasher, an auto-lamp relay, an indicator lamp module, a speed control module, a blower motor relay, an antenna module, an air bag, an auto-ride control, a theftproof control unit and a remote control, arranged near the meter module 3.

Among these circuit control units 4, for example the hatched portions, i.e., the sub-electric junction box $4_2$, the integration module $4_3$, the indicator lamp module $4_4$, the speed control module $4_5$ and the auto-ride control $4_6$ are intensively incorporated in the meter module 3 of the present invention. Accordingly, the number of cables is greatly reduced inside the instrument panel 2 and in floor sides 2', 2" of cabin, simplifying the wiring arrangement. Further, the saved space as previously occupied by the units can be utilized for setting of other electric devices.

Figure 2:
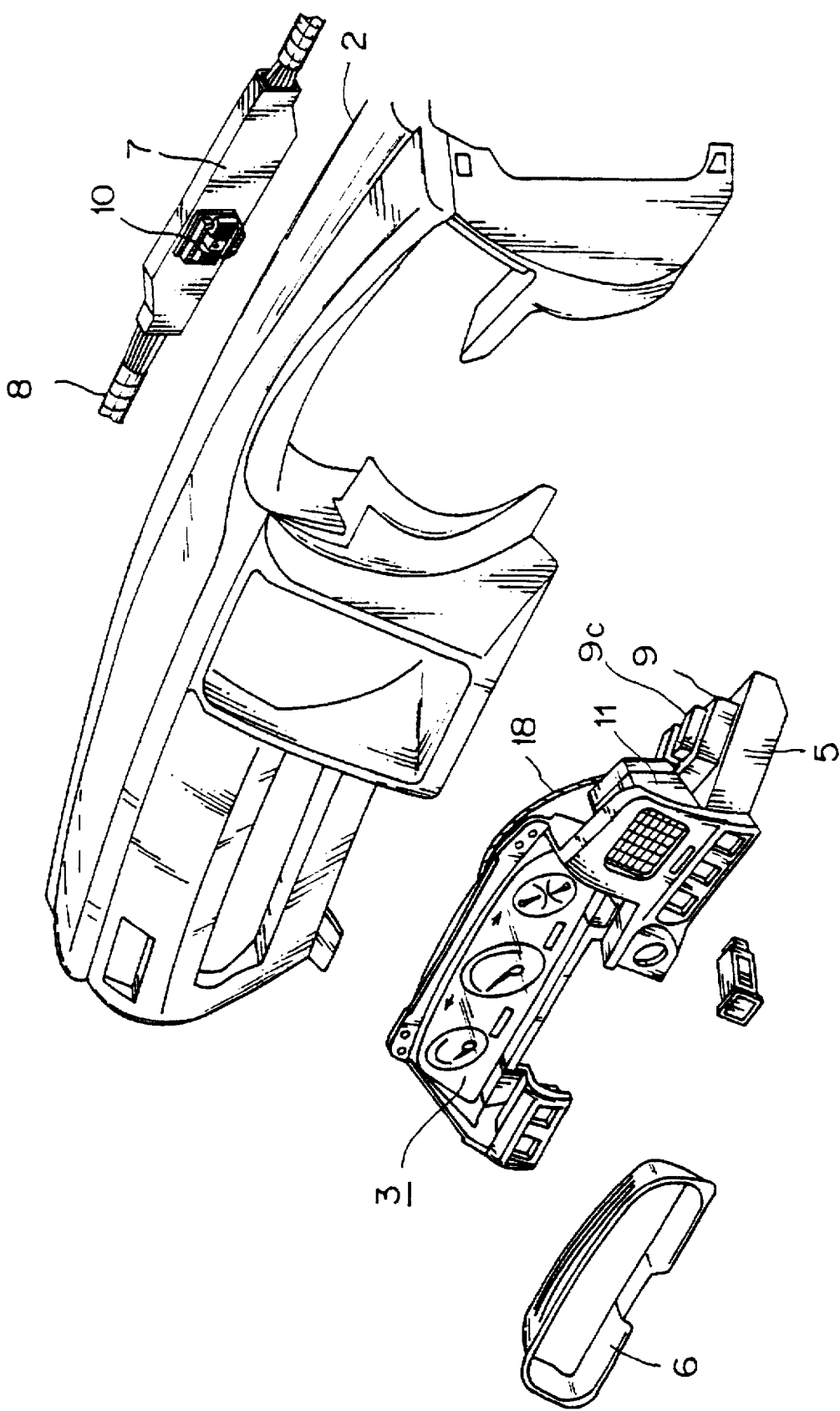
FIG. 2 is a perspective view to show a separate state of a meter module and an instrument panel portion in an embodiment of the present invention.

FIG. 2 is a perspective view to show a separate state of a meter module 3 of the present invention and an instrument panel 2.

In FIG. 2, reference numeral 5 designates a cluster frame, and 6 a finish panel. The meter module 3 is set in the cluster frame 5 to form a cluster, which is fit into the instrument panel 2. The finish panel 6 could be assembled with the instrument panel 2 after fixed on the meter module 3, but is mounted in this case to the meter module 3 after the meter module 3 is assembled on the instrument panel 2. Numeral 7 denotes a wiring harness protector for protecting an instrument panel wiring harness (hereinafter referred to as in-pane harness) 8. The protector 7 has a screw-type multipolar connector 10 incorporated therein and arranged to be connected directly to the meter module 3. Numeral 9 denotes a main electric junction box (see FIG. 3) of known structure with a number of fuses 9a and relays 9b mounted therein and with a plurality of connectors 9c for harness connection provided thereon, which corresponds to the main electric junction box $4_1$ in FIG. 1.

Figure 3:
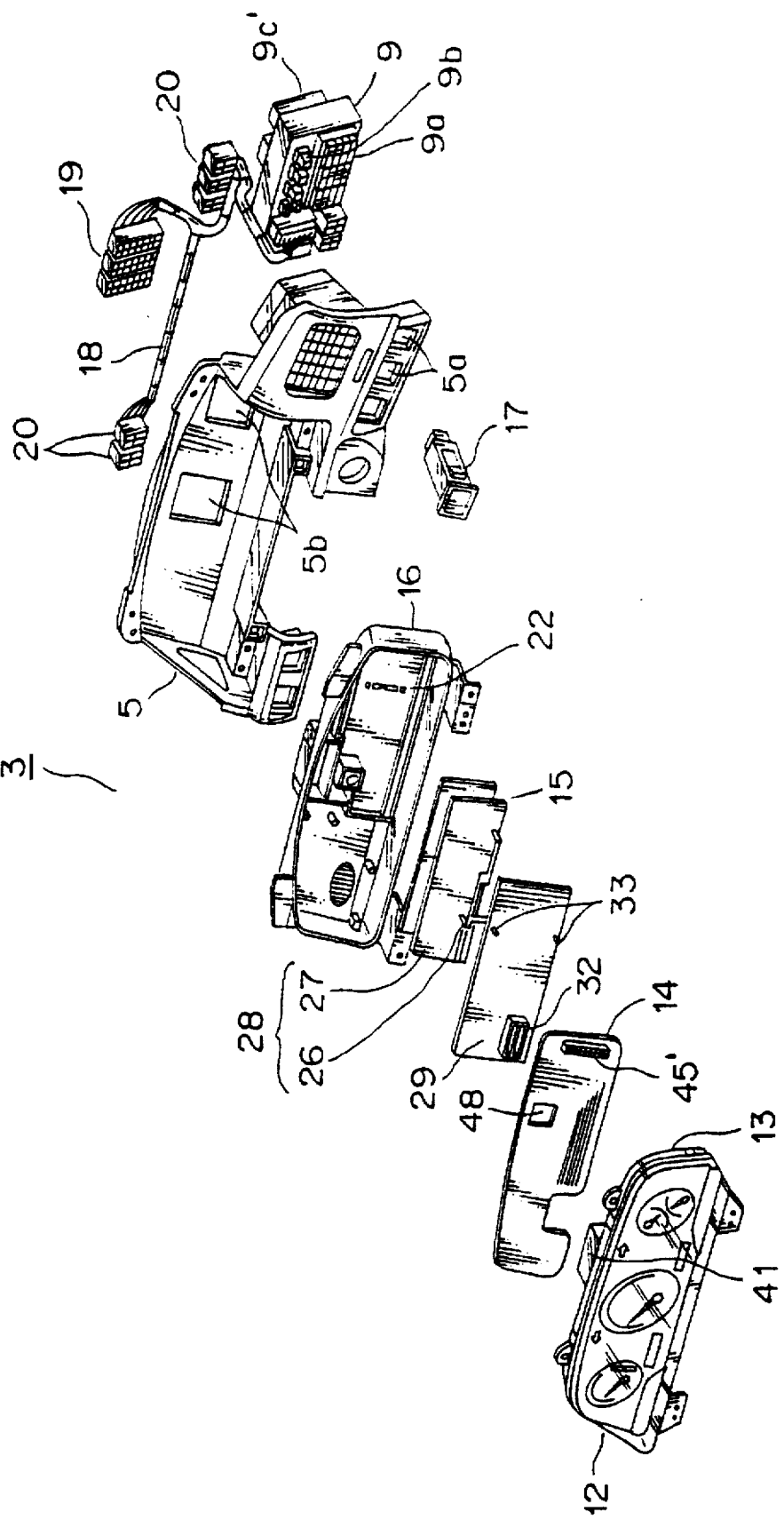
FIG. 3 is an exploded perspective view of the meter module.

The meter module 3 is composed mainly of a meter panel 12, a printed-wiring board 13 thereof, a centralized control circuit plate 14, an electric junction box (J/B) 15 and a module case 16, as shown in FIG. 3.

Numeral 17 is a switch for fog lamp shown as a representative, and each of switches is fit into and fixed in a mounting opening 5a in the cluster frame 5. Numeral 18 denotes a sub-wiring harness for module, which has a plurality of connectors for J/B connection 19 in the middle and connectors 20 for direct connection to devices on the both ends.

Figure 4:
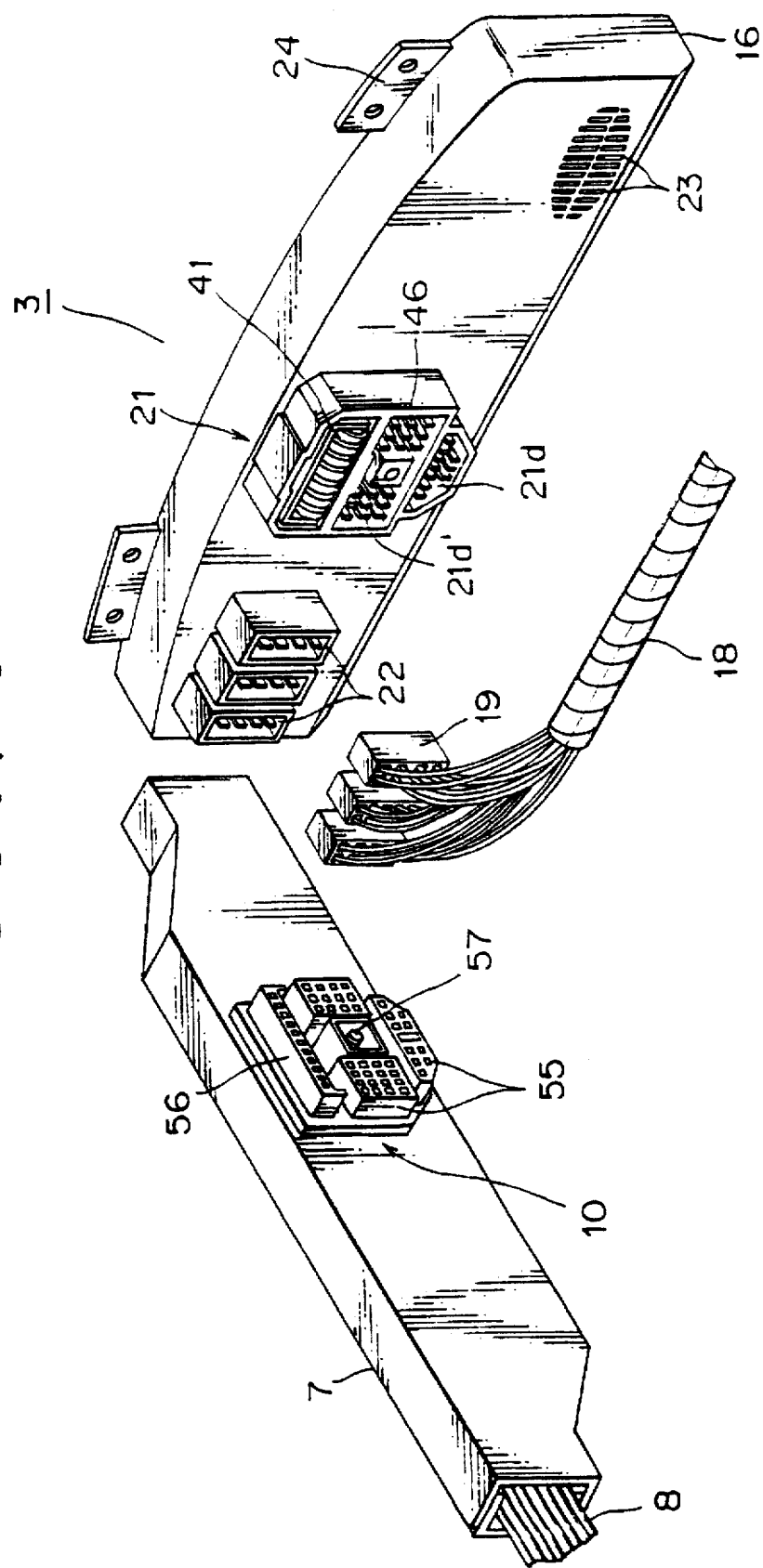
FIG. 4 is a perspective view to show mutual relations between a meter module, an instrument panel harness and a sub-wiring harness.
Figure 5:
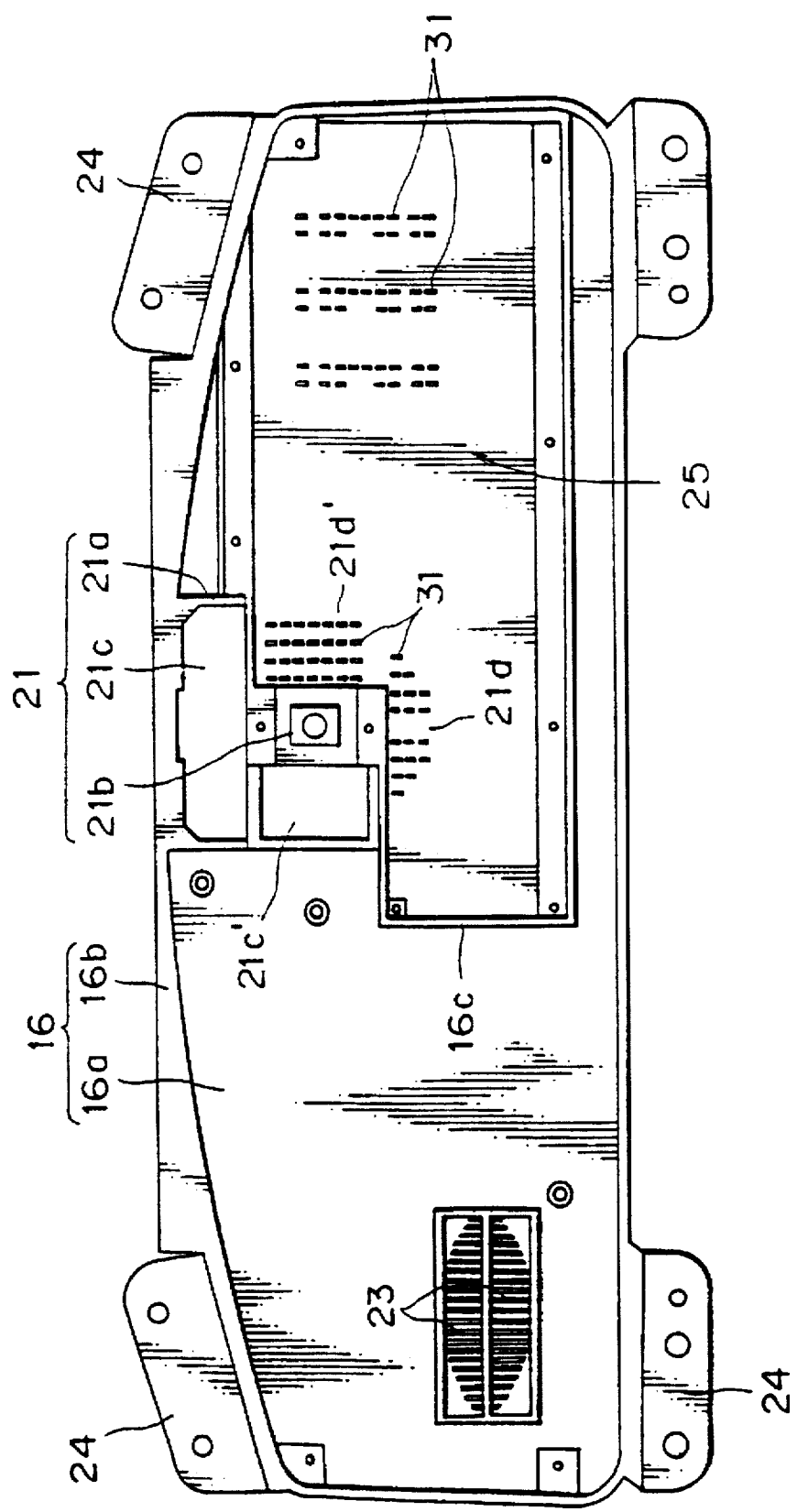
FIG. 5 is a front view of a module case as shown in FIG. 4.

FIG. 4 is a perspective view to show mutual relations among the module 3, the in-pane harness 8 and the sub-wiring harness 18, and FIG. 5 is a front view of the module case 16.

In FIG. 4 and FIG. 5, the module case 16 of module 3 is a rectangular box composed of a bottom wall 16a and a peripheral wall 16b, which is made of a synthetic resin insulator such as a polybutylene terephthalate (PBT), a polypropylene, a polyamide resin, or a PPS resin. A connector 21 for in-pane harness connection is formed to project from the central portion on the back face of bottom wall 16a of module case 16. Further, a plurality of connectors 22 for sub-wiring harness connection are provided on one side and a plurality of vent holes 23 on the other side on the back face of bottom wall 16a. Mount plates 24 to the cluster frame 5 are provided at corners of the peripheral wall 16b on the front face.

The in-pane harness connecting connector 21 is formed as an aggregate connector which can fit in with the multipolar connector 10 of in-pane harness 8, which is composed of a frame 21a integral with the module case 16, a bolt receiver 21b at the central portion thereof, connector fitting openings 21c and 21c' above and beside the receiver 21b, and J/B connector portions 21d and 21d' below and on the other side of the bolt receiver 21b. Fit in with the connector fitting opening 21c is a connector 41 for in-pane harness connection of the printed-wiring board 13 on the back face of the meter panel 12, as described below. Also fit in with the connector fitting opening 21c' is a connector 46 for in-pane harness connection of the centralized control circuit plate 14. Further, fit as connector terminals in the J/B connector portions 21d and 21d' are tabs 30 of bus-bars 26 in the electric junction box 15, as also described later.

A partition wall 16c is formed continuous from the frame portion 21a at the front center of module case 16 to define an electric junction box receiving portion 25 on one side thereof. The electric junction box 15 is constructed, as shown in FIG. 3, such that a plurality of layers (two layers in the illustrated example) of bus-bar circuit boards 28 each composed of a plurality of bus-bars 26 and an insulator plate 27 supporting them are built up in the electric junction box receiving portion 25 and an insulator cover 29 is arranged over the bus-bar circuit boards 28 as incorporated in the module case 16.

The tabs 30 as connector terminals (see FIG. 6) stand in series in the middle portion and (or) in the end portion of each bus-bar 26. The tabs 30 pierce tab through holes 31 provided in the bottom wall 16a to constitute the sub-wiring harness connecting connector 22 and the J/B connector portions 21d and 21d'. Also, some of tabs 30 pierce through tab through holes 31 in the insulator cover 29 (see FIG. 9A) to constitute a connector 32 for centralized control circuit plate connection. Further, spacers 33 with screw hole project near the edge of the insulator cover 29, which permit the insulator cover 29 to be fixed on the module case 16 and which also permit the centralized control circuit plate 14 to be fixed with an appropriate space V relative to the insulator cover 29 (see FIG. 6).

Figure 6:
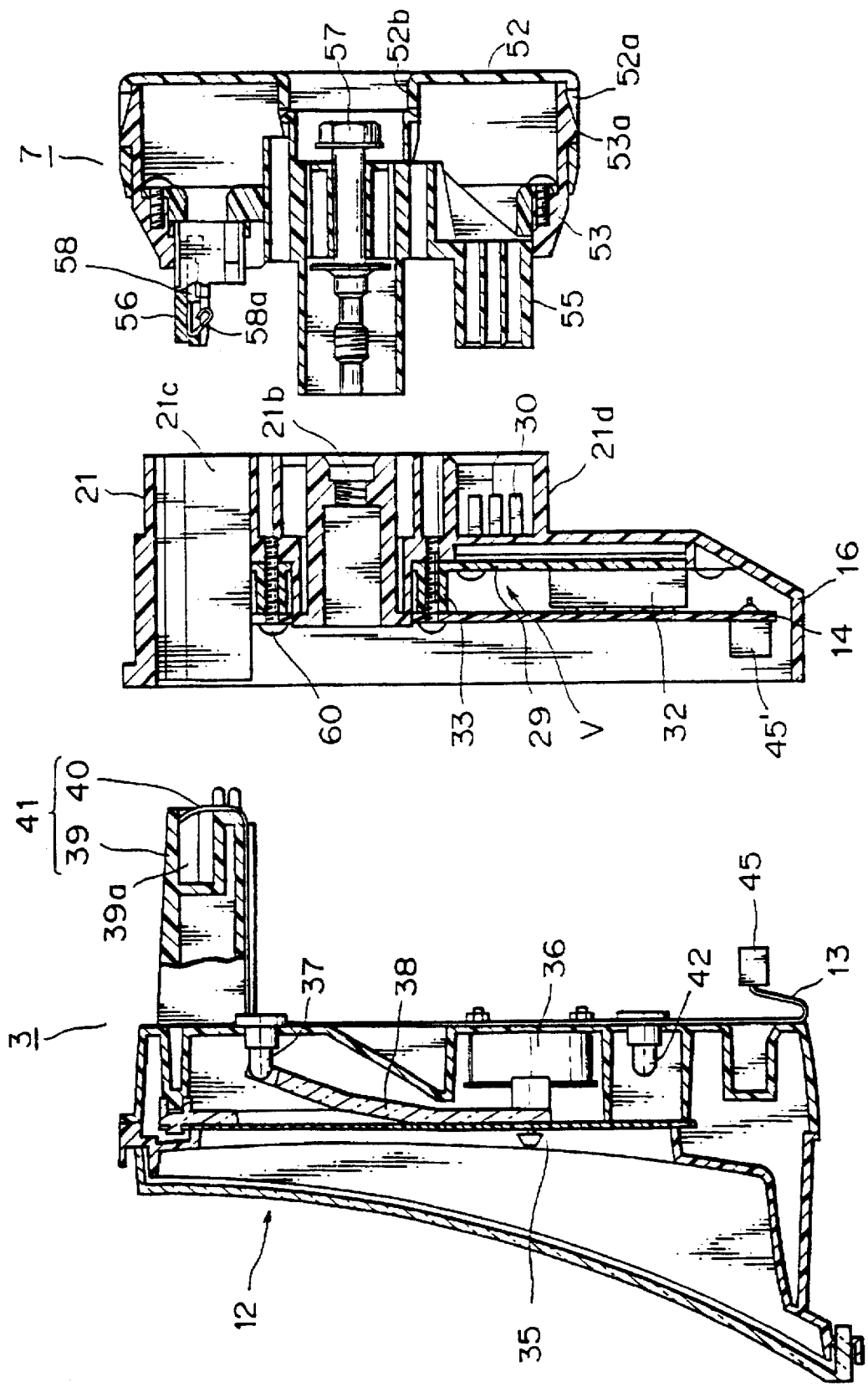
FIG. 6 is a cross sectional view to show a separate state of a meter module and a wiring harness protector.
Figure 7:
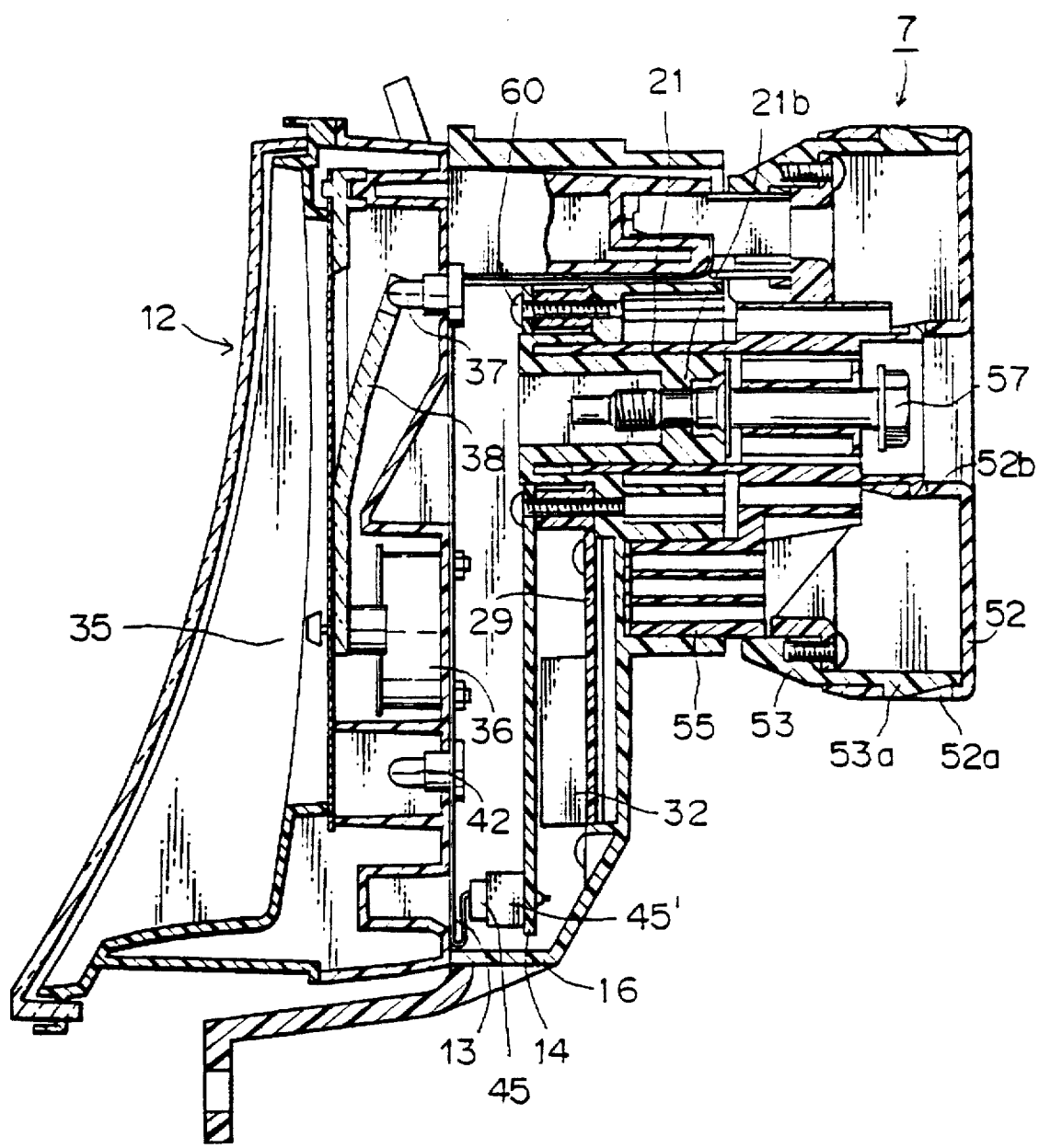
FIG. 7 is a cross sectional view to show an assembled state of the meter module and the wiring harness protector as shown in FIG. 6.
Figure 9A:
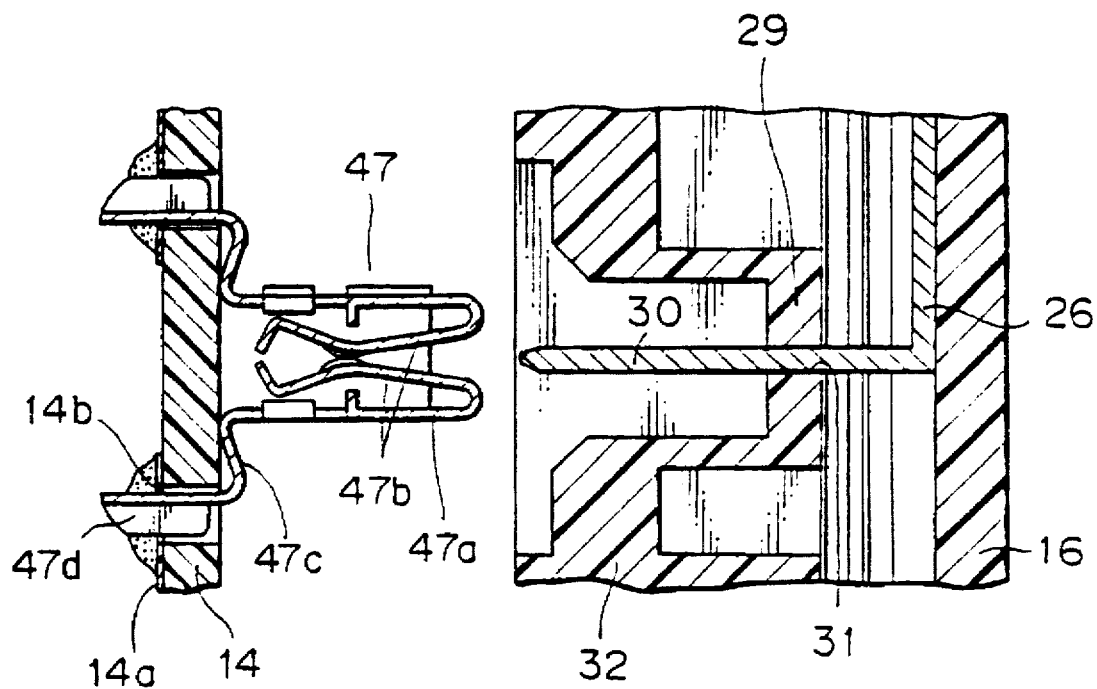
FIG. 9A and FIG. 9B are enlarged cross sectional views to show a separate and an assembled state, respectively, of connector portions as shown in FIG. 8.
Figure 9B:
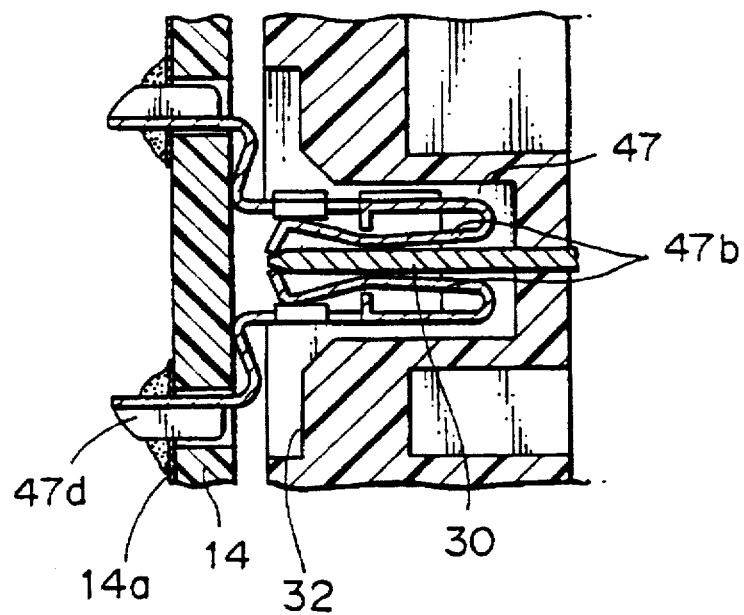
Figure 10A:
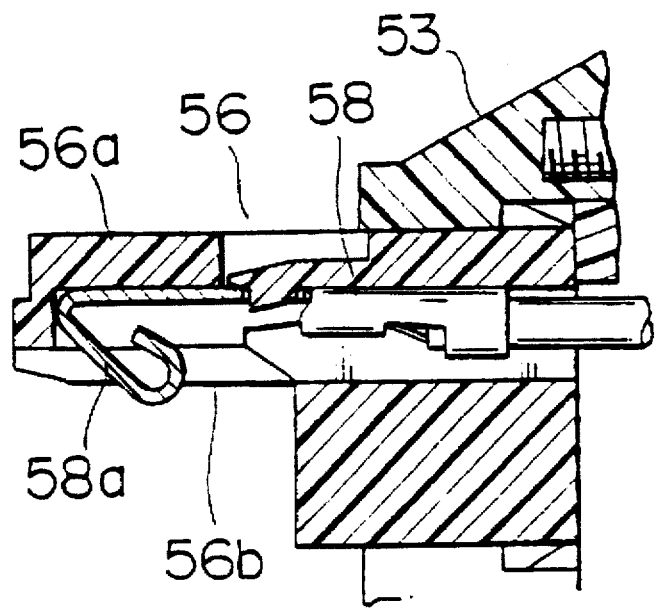
FIG. 10A is an enlarged cross sectional view to show a portion of a separate connector 56 as shown in FIG. 6.
Figure 10B:
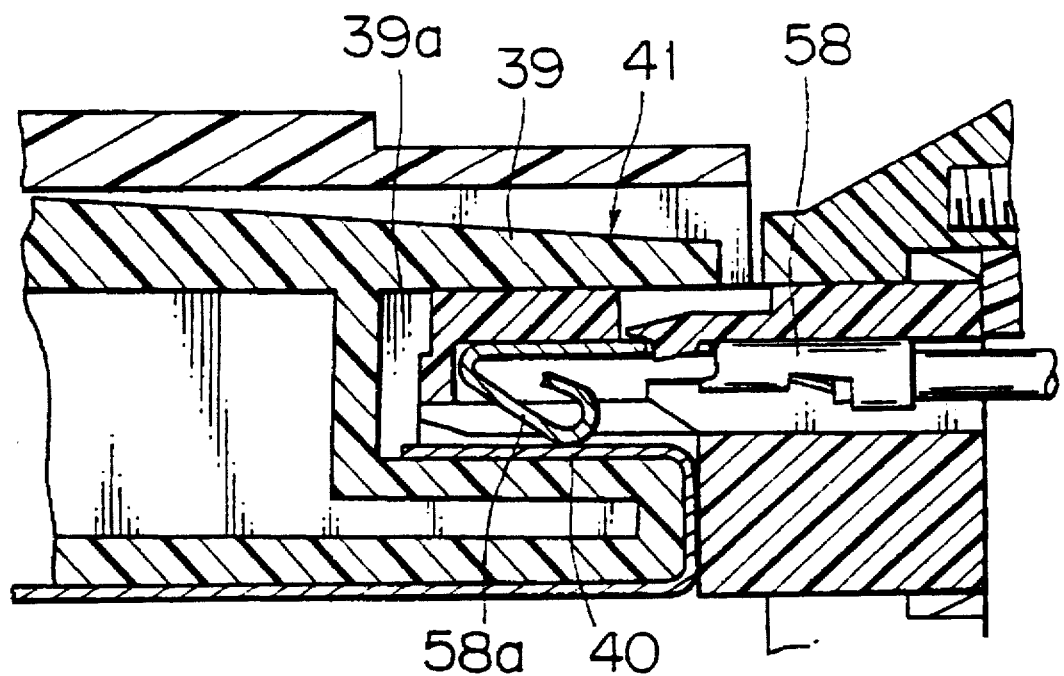
FIG. 10B is an enlarged cross sectional view to show a connected state of the connector 56 with a connector 41.
Figure 11A:
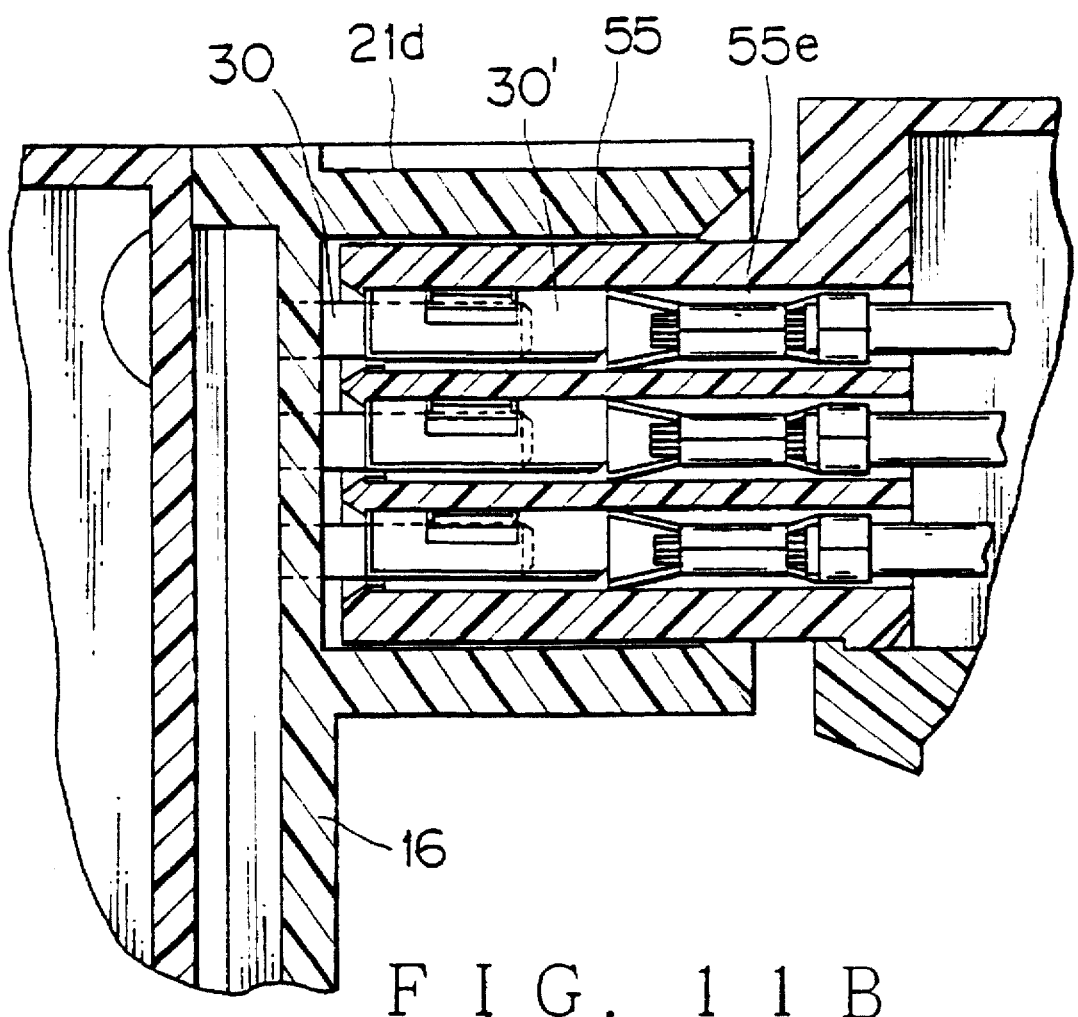
FIG. 11A is an enlarged cross sectional view to show a connected state between a J/B (junction box) connector portion 21d and a separate connector 55 as shown in FIG. 6.
Figure 11B:
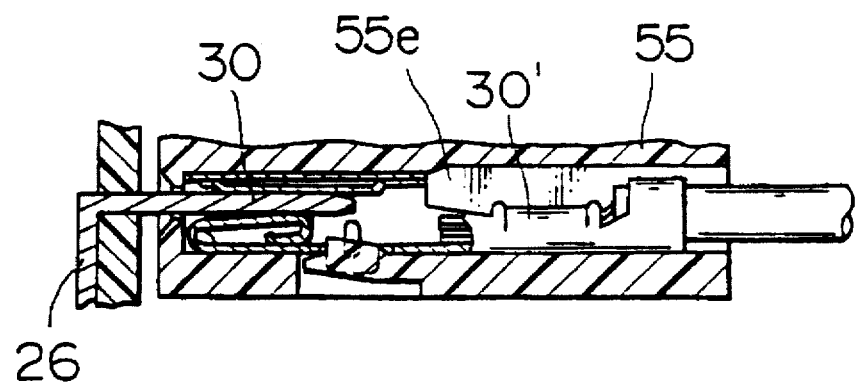
FIG. 11B is a longitudinal cross section of the connected connectors as shown in FIG. 11A.
Figure 12:
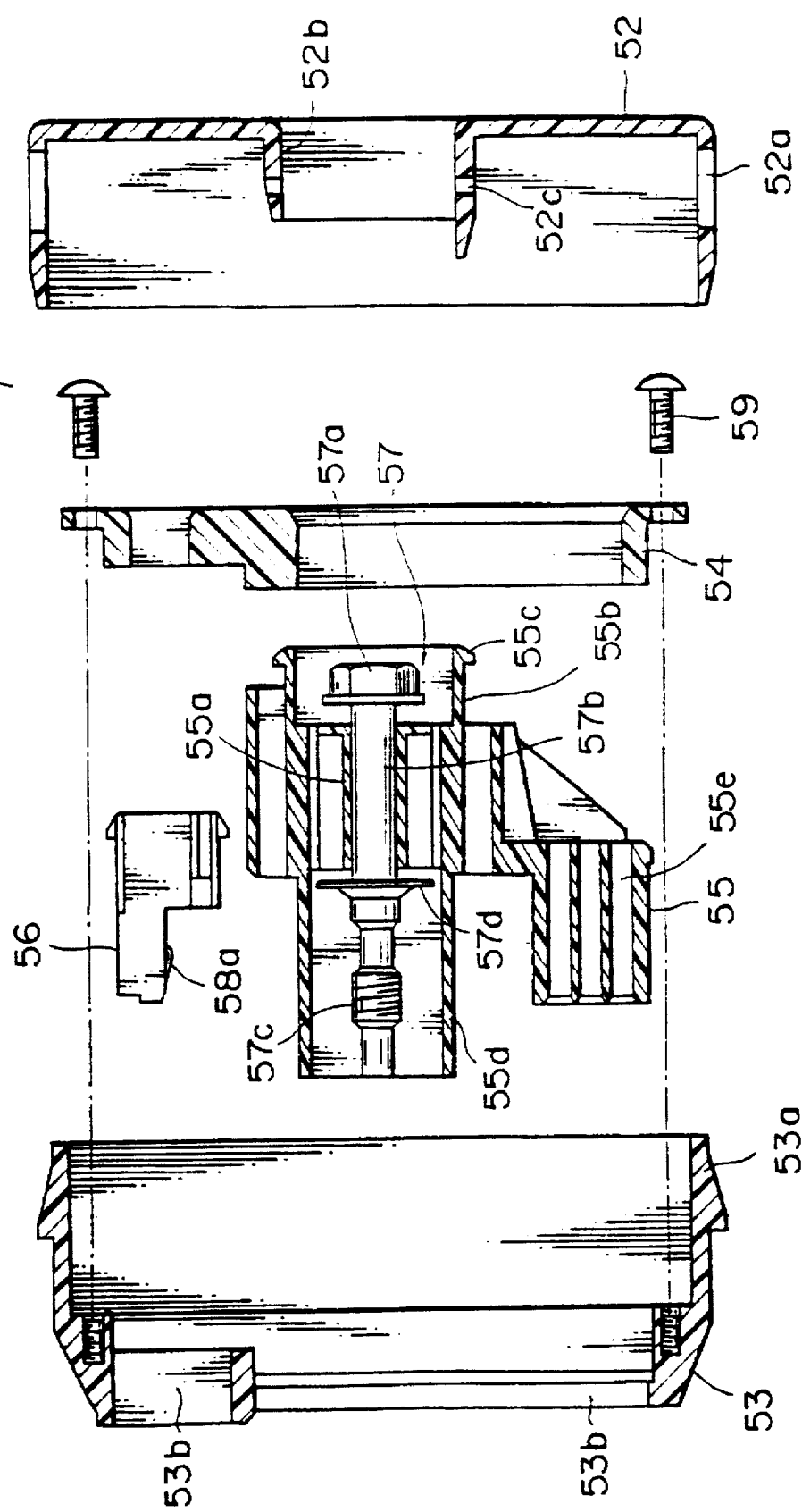
FIG. 12 is a cross sectional view to show a separate state of a wiring harness protector.
Figure 13:
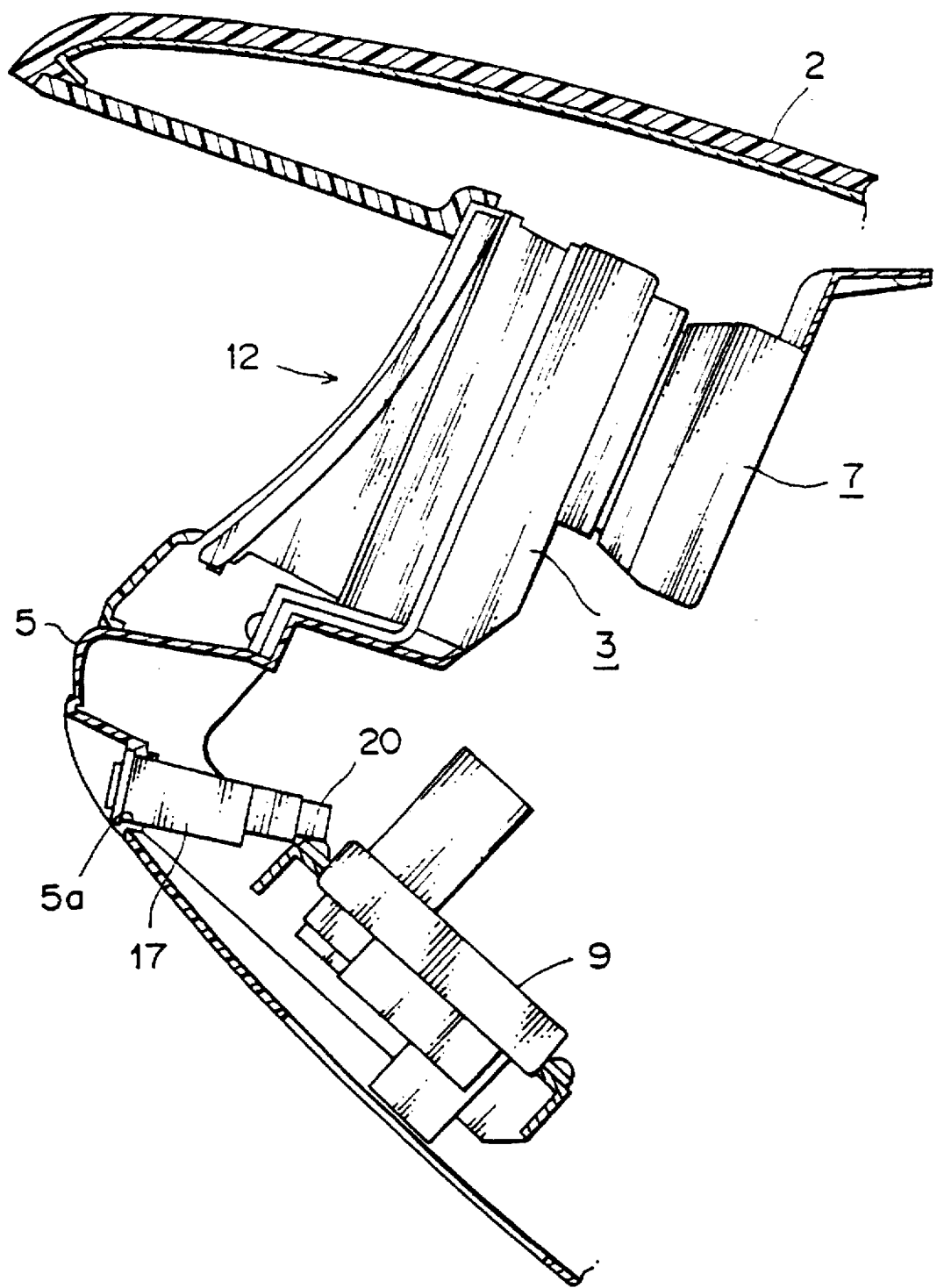
FIG. 13 is a cross sectional view to show an assembled state of a meter module and an instrument panel.

FIG. 6 is a cross sectional view to show a separate state of the meter module 3 and the wiring harness protector 7, FIG. 7 a cross sectional view to show an assembled state thereof, FIG. 8A and FIG. 8B cross sectional views to show a separate state and an assembled state, respectively, of the centralized control circuit plate 14 and the electric junction box 15, FIG. 9A and FIG. 9B enlarged cross sectional views to show a separate state and a connected state, respectively, of the connectors 32 shown in FIGS. 8A and 8B, FIG. 10A and FIG. 10B an enlarged cross sectional view to show a portion of separate connector 56 shown in FIG. 6 and an enlarged cross sectional view to show a connected state thereof with the connector 41, respectively, FIG. 11A and FIG. 11B an enlarged cross sectional view, and a longitudinal cross sectional view, respectively, to show a connected state of the J/B connector portion 21d and a separate connector 55 shown in FIG. 6, FIG. 12 a cross sectional view to show a separate state of wiring harness protector 7, and FIG. 13 a cross sectional view of main part to show an assembled state of the meter module 3 and the instrument panel 2.

In these drawings, meters and indication lamps (a meter 35 in the illustrated example) are mounted on the front face of the meter panel 12, and a printed-wiring board (FPC) 13 electrically connected to a movement 36 of meter 35 and to the indication lamps is attached to the back face. There are a dial illumination bulb 37 and a light guide plate 38 for guiding light from the bulb to dials, provided on the front side of printed-wiring board 13, and a seat 39 having a recess 39a as extending on the back side. A circuit connection portion 40 extends from the printed-wiring board 13 along the seat 39 to form the in-pane harness connecting connector 41 by the seat 39 and the circuit connection portion 40.

Figure 14:
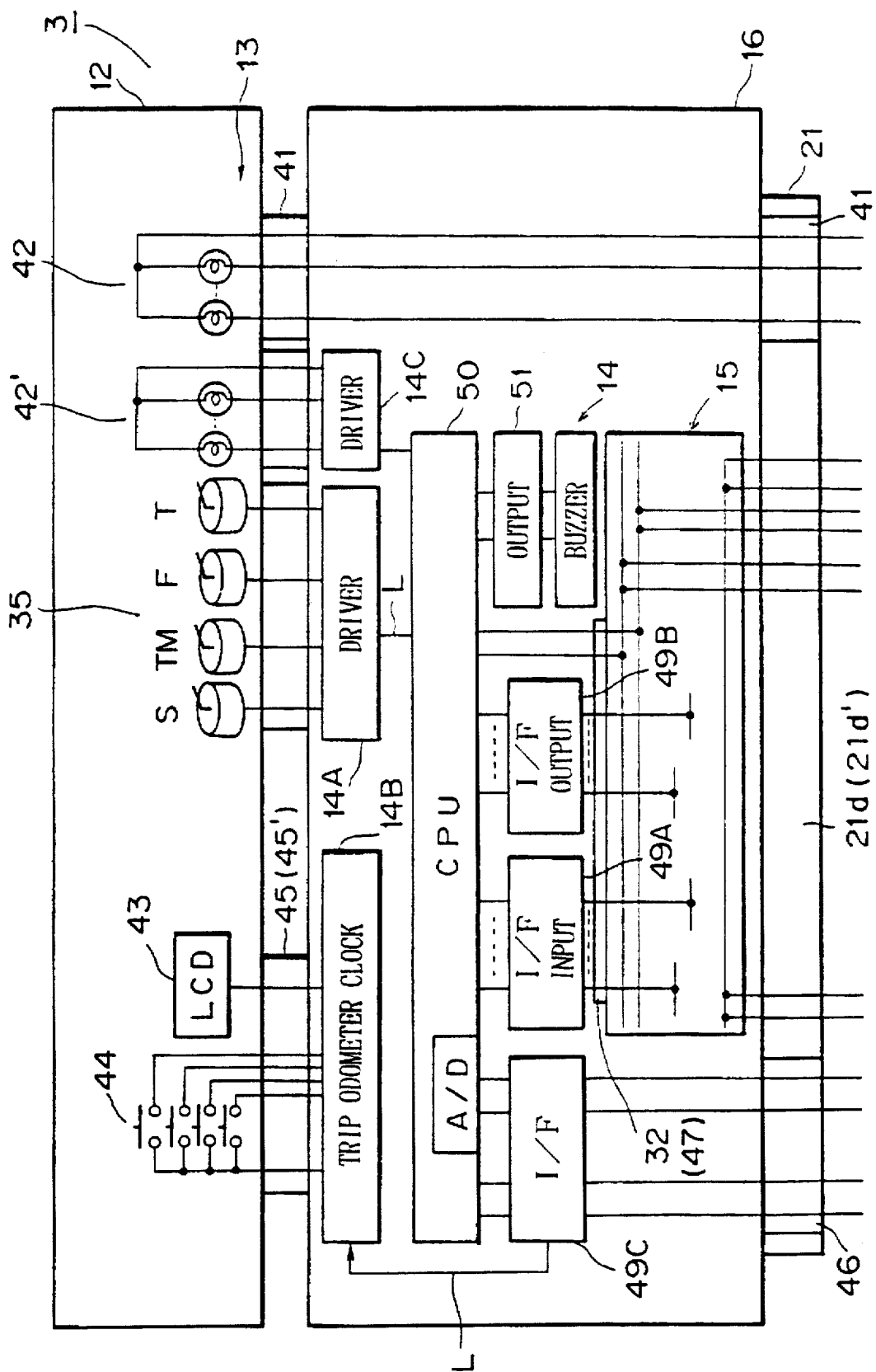
FIG. 14 is a block wiring diagram of the meter module according to the present invention.

There are mounted on the meter panel 12, as shown in FIG. 14, meters 35 such as a speedometer S, a tachometer TM, a fuel gauge F and a radiator thermometer T, indicator lamps 42, 42', LCD 43 for selectively indicating trip, odometer and clock, and switches 44 for changing over the indication of the LCD 43. Also, the printed-wiring board 13 is provided with the in-pane harness connecting connector 41 as described above and a connector 45 (see FIG. 6) for connection with the centralized control circuit board or plate 14.

In FIGS. 8A, 8B and FIGS. 9A, 9B, the centralized control circuit board 14 is provided with a connector 45' for meter panel connection on one face and the in-pane harness connecting connector 46 and the J/B connection terminal 47 on the other face. Further, the circuit board 14 has an opening 48 (see FIG. 3) at the center. One can view the bottom side of bolt 57 set in the connector on the in-pane harness side through the opening 48 after the in-pane harness 8 is connected, and can release the connector connection by inserting a release tool through the opening 48 into the bottom face and unscrewing the bolt.

The centralized control circuit board 14 is constructed such that there are incorporated in an ordinary hard printed-wiring board (HPC), as shown in FIG. 14, a driver circuit 14A, an operation drive unit 14B and a driver circuit 14C as described below, together with interface (I/F) circuits 49A, 49B, 49C, memories necessary for electronic controls of meters and indication lamps in the meter panel 12, and other electric devices (which are not limited to those installed in the instrument panel 2), a microcomputer (CPU) 50 for processing, and other output circuit 51.

The in-pane harness connecting connector 46 is composed of terminals 46a to be connected with the I/F circuit 49C in FIG. 14 and a housing 46b for the terminals. Also, the J/B connection terminal 47 is constructed such that upper ends of a pair of base plates 47a opposed to each other are folded to form elastic contact pieces 47b and contact pieces 47d for soldering are continuously formed through expanded pieces 47c from the bottom ends of the base plates 47a. The pair of contact pieces 47d, 47d are inserted into holes 14b in land portion 14a of the centralized control circuit board 14 and soldered to power lines to the I/F circuits 49A, 49B, CPU 50, etc. so as to be fixed there.

As shown in FIGS. 8A, 8B and FIGS. 9A, 9B, when the centralized control circuit board 14 is brought into a butt contact with the insulation cover 29 constituting the electric junction box 15, the in-pane harness connecting connector 46 is made to fit in the connector fitting opening 21c' and each tab 30 of bus-bar 26 comes to fit in between the paired elastic contact pieces 47b and 47b of each J/B connection terminal 47, achieving electric connection between the centralized control circuit board 14 and the electric junction box 15.

The centralized control circuit plate 14 is so arranged as to be used for all car types and grades, provided with the memory functions, the operational functions such as the speed control, various functions such as digitalized functions for meters, key reminder, light reminder, timer function for wiper control, multi indication function such as clock, trip, odometer, etc. It is also preferred that the circuit board 14 is preliminarily provided with optional functions such as navigation, multi function switch, theftproof control, keyless entry or the like. Alternatively, the circuit board can be interchanged with another centralized control circuit plate provided with such optional functions.

As shown in FIG. 12, the wire harness protector 7 is composed of a protector main body 52 and a cover 53 thereof, which are provided with engaging holes 52a and engaging pawls 53a, respectively, constituting lock means. Numeral 54 designates a connector stopper. Separate connectors 55, 56 constituting the multipolar connector 10 are inserted into a through hole 53b in the cover 53 and then the connector stopper 54 is set thereon and fixed to the cover 53 by screws 59.

A bolt 57 is set along the axial direction of fitting in the separate connector 55. The protector main body 52 has an opening frame 52b for screwing corresponding to the bolt 57. Numeral 55a denotes a bolt set portion, and stoppers 55c are provided on a rear end opening portion 55b of the bolt set portion 55a. Also, a bolt fitting portion 55d is provided on the opposite side, and the opening frame 52b has stopper holes 52c corresponding to the stoppers 55c. Female terminals 30' to be coupled with the associated tabs 30 of electric junction box 15 are received and stopped in terminal receiving rooms 55e in the separate connector 55, as shown in FIGS. 11A and 11B. Further, 57a denotes a head of bolt 57, 57b a shank thereof, 57c a thread part thereof, and 57d a stop ring.

Another separate connector 56 is for connection with the in-pane harness connecting connector 41, and is constructed, as shown in FIGS. 10A and 10B, such that a side surface 56b of housing 56a is open to expose an elastic contact piece 58a of connector terminal 58 as facing the opening portion, whereby the contact piece 58a can surface-contact the land (copper foil) of the circuit connection portion 40.

Before assembling the wiring harness protector 7, the separate connectors 55, 56 are preliminarily connected to desired cable terminals in the in-pane harness 8 (see FIG. 2). Then, the protector 7 can be readily assembled as follows: A part of in-pane harness 8 is stored in the protector main body 52, the connectors 55, 56 are set and fixed in the cover 53 by the connector stopper 54 as described above, and thereafter the cover 53 is positioned on the protector main body 52 to engage the engaging pawls 53a with the engaging holes 52a as locking them.

In the above arrangement, the meter module 3 is assembled as follows.

First, the plurality of bus-bar circuit boards 28 (see FIG. 3) are set i the electric junction box receiving portion 25 in the module case 16 in FIG. 5, so that the tabs 30 of the bus-bars 26 come to project through the tab through holes 31 to form the J/B connector portions 21d, 21d'. After that, the insulator cover 29 is set over the bus-bar circuit boards to form the connector 32 for centralized control circuit board similarly. By this, the electric junction box 15 is assembled as incorporated in the module case 16.

Then, as described with FIGS. 8A, 8B and FIGS. 9A, 9B, the centralized control circuit board 14 is brought into a butt contact with the electric junction box 15, whereby the in-pane harness connecting connector 46 is made to fit in with the connector fitting opening 21c' and the tabs 30 are connected to the J/B connection terminals 47 to electrically connect the centralized control circuit board 14 with the electric junction box 15. Then the centralized control circuit board 14 is fixed on the electric junction box 15 by screws 60.

As described above, the electric junction box 15 and the centralized control circuit board 14 are so arranged as to avoid complete overlap with each other. That is, the board 14 is shifted relative to the box 15 to the side of the vent holes 23 in the module case 16. Further, an appropriate space V is secured through spacers 33 between the board 14 and the box 15. As so arranged, the centralized control circuit board 14 is almost free of influence of heating by current flow in the portion of electric junction box 15 accordingly.

Further, the connector 45 of the printed-wiring board 13 in the meter panel 12 is made to fit in with the meter panel connecting connector 45' of the centralized control circuit board 14 (see FIG. 3 and FIG. 7). Also, the in-pane harness connecting connector 41 is set in the connector fitting opening 21c. Thus, the meter panel 12 is connected to the centralized control circuit board 14 as incorporated with the module case 16. As described above, the meter module 3 can be assembled very easily.

Then, the meter module 3 is set in the cluster frame 5 in this state as described above and is fixed by screws, forming a cluster. The cluster is set in the instrument panel 2 as it is, and is fixed there. Finally, the finish panel 6 is fixed on the instrument panel 2.

Connection is also easy as described below for the meter module 3 or the cluster with the in-pane harness 8 and the sub-wiring harness 18.

The J/B connection connector 19 of sub-wiring harness 18 is made to fit with the sub-wiring harness connecting connector 22 of electric junction box 15 exposed from a window 5b in the cluster frame 5. Also, connectors 20 for direct connection to devices at the ends of sub-wiring harness 18 are connected directly to devices such as a switch 17 fixed in the mounting opening 5a in cluster frame 5, as shown in FIG. 13.

Finally, the separate connectors 55, 56 provided in the protector 7 are positioned to the in-pane harness connecting connector 21 on the back face of meter module 3 and pushed thereinto. Thus, the separate connectors 55, 56 are made to fit in the J/B connector portions 21d, 21d', respectively, to be connected with the in-pane harness connecting connector 46 and the connector 41, as shown in FIG. 6, FIG. 10 and FIG. 11. Consequently, necessary electric connections are established between the in-pane harness 8, the sub-wiring harness 18 and the meter module 3 (centralized control circuit board 14 and electric junction box 15).

FIG. 14 is a block wiring diagram using the meter module 3 of the present invention.

+B power, ACC power and IGN power supplied to the meter module 3 are supplied to the centralized control circuit board 14 and the meter panel 12 through the electric junction box 15 in the module. Information (signals) necessary for controlling various functions such as unlighting request warning (light reminder) and keyless entry are supplied from the various control modules and the signal generating means such as actuators, switches and sensors scattered in the cabin, through the I/F circuit 49A and the other I/F circuits (not shown) in the meter module 3 to the CPU 50. The CPU 50 executes necessary processing (operation) depending upon the input signal and outputs an output signal such as a buzzer ring output or a door lock drive output through the output circuit 51 and the output I/F circuit 49B.

In addition to the various functional operations and controls, the CPU 50 executes a drive control of movement 36 set in the meter panel 12 and on-off controls of various indicators 42'. Each movement 36 as of speedometer S and tachometer TM is a cross coil movement. The movements are driven by a single driver circuit 14A by dynamic drive (time-division drive). The CPU 50 takes in sensor signals necessary for the movement drive through the input I/F 49C and calculates a measurement amount for each movement. Then, the CPU 50 serially transfers the calculation results to the driver circuit 14A through multiple signal lines L.

LCD 43 for odometer, trip and clock indication is display-controlled by an odometer-trip-clock calculation drive unit 14B for receiving speed signals from I/F circuit 49C to calculate a cumulative distance and to count the time. Numeral 44 designates indication change-over switches for selectively changing over the indication of LCD 43 among odometer indication, trip indication and clock indication.

Figure 37:
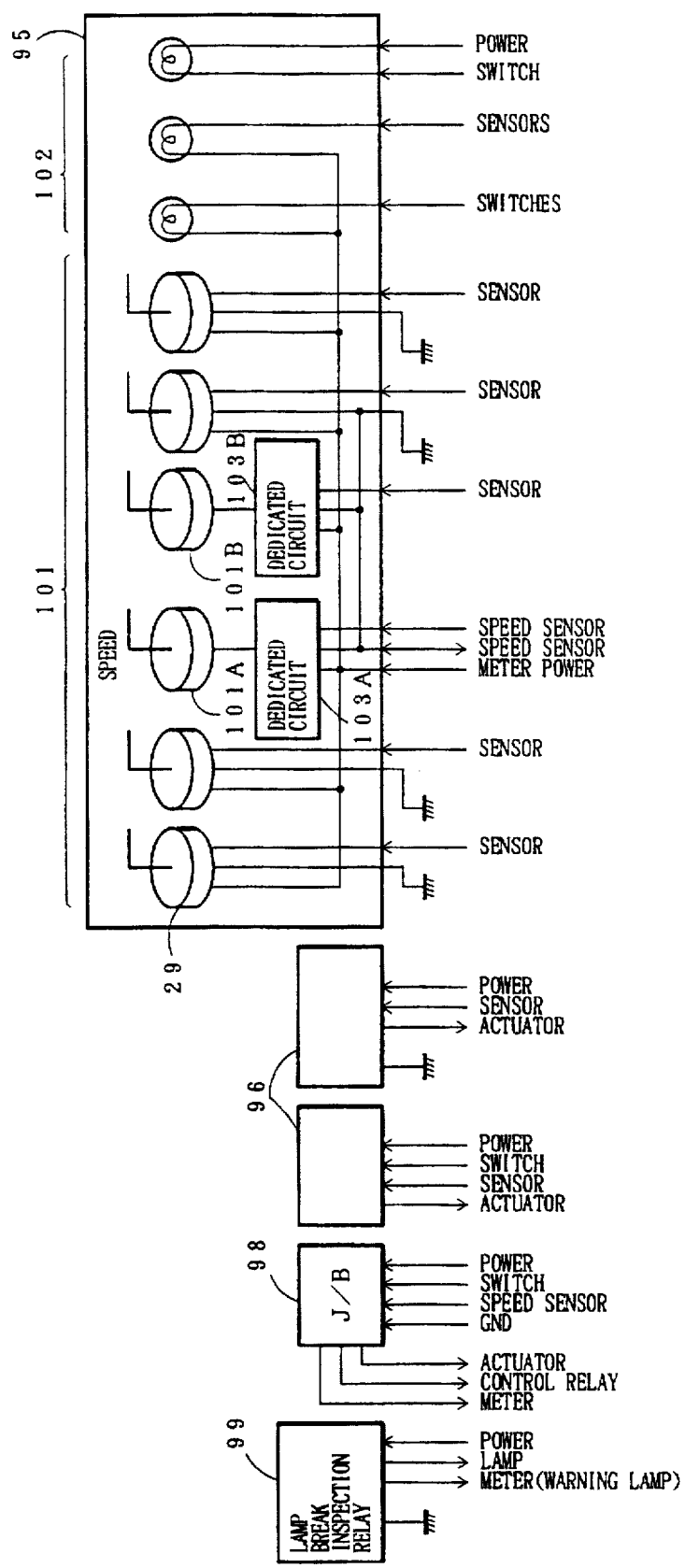
FIG. 37 is a block wiring diagram to show the conventional wiring for combination lamps, relays and electric junction box.
Figure 38:
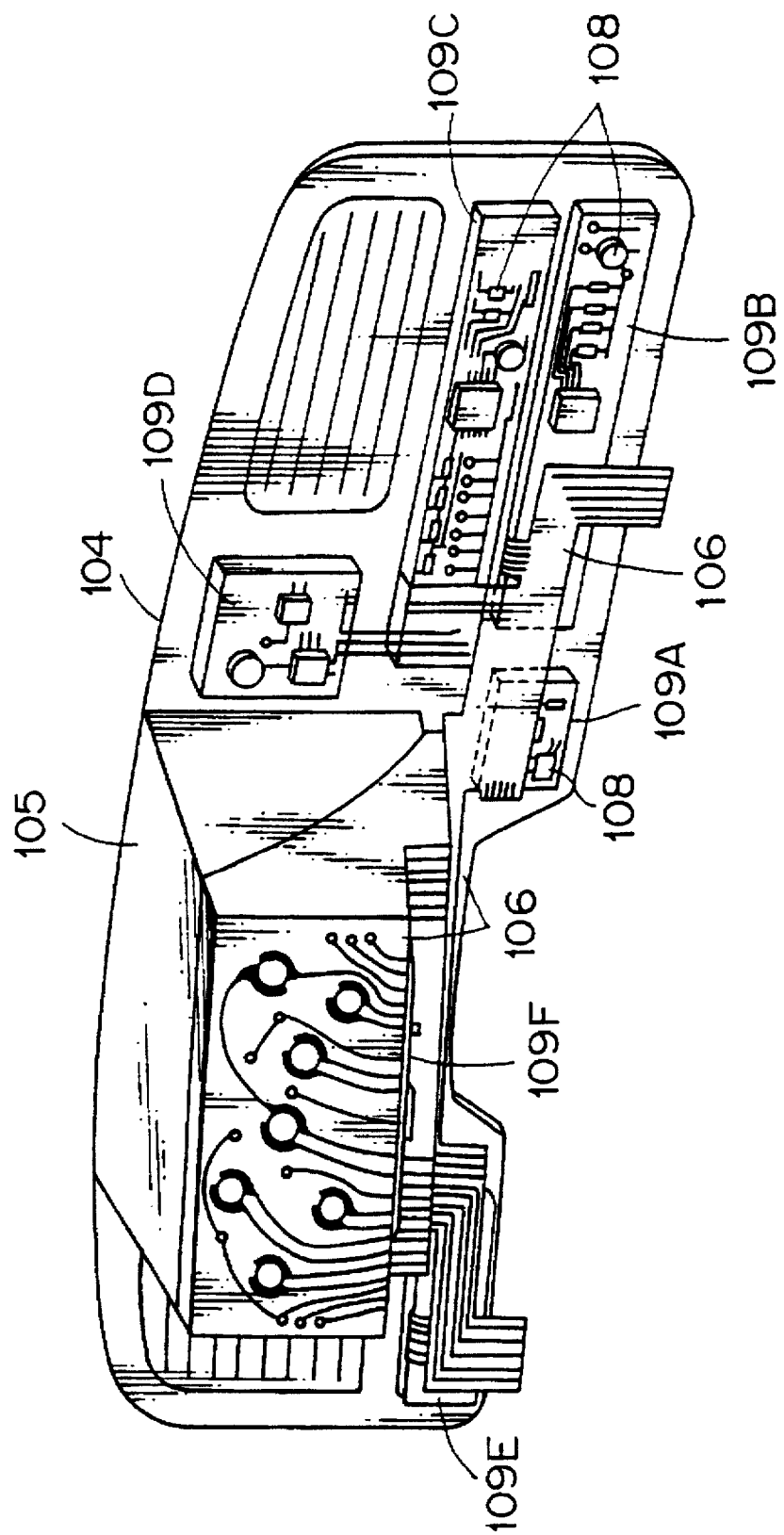
FIG. 38 is an explanatory drawing to show the electric circuit structure of a conventional instrument panel portion.

Comparing FIG. 14 with FIG. 37 showing the conventional example, it is apparent that the number of circuits (the number of cables) gathering around the instrument panel can be greatly reduced as a whole, for example because the control circuit units 96, the electric junction box 98, the lamp breakage inspection relay 99, etc. are absorbed in the meter module 3 according to the present invention.

Figure 15:
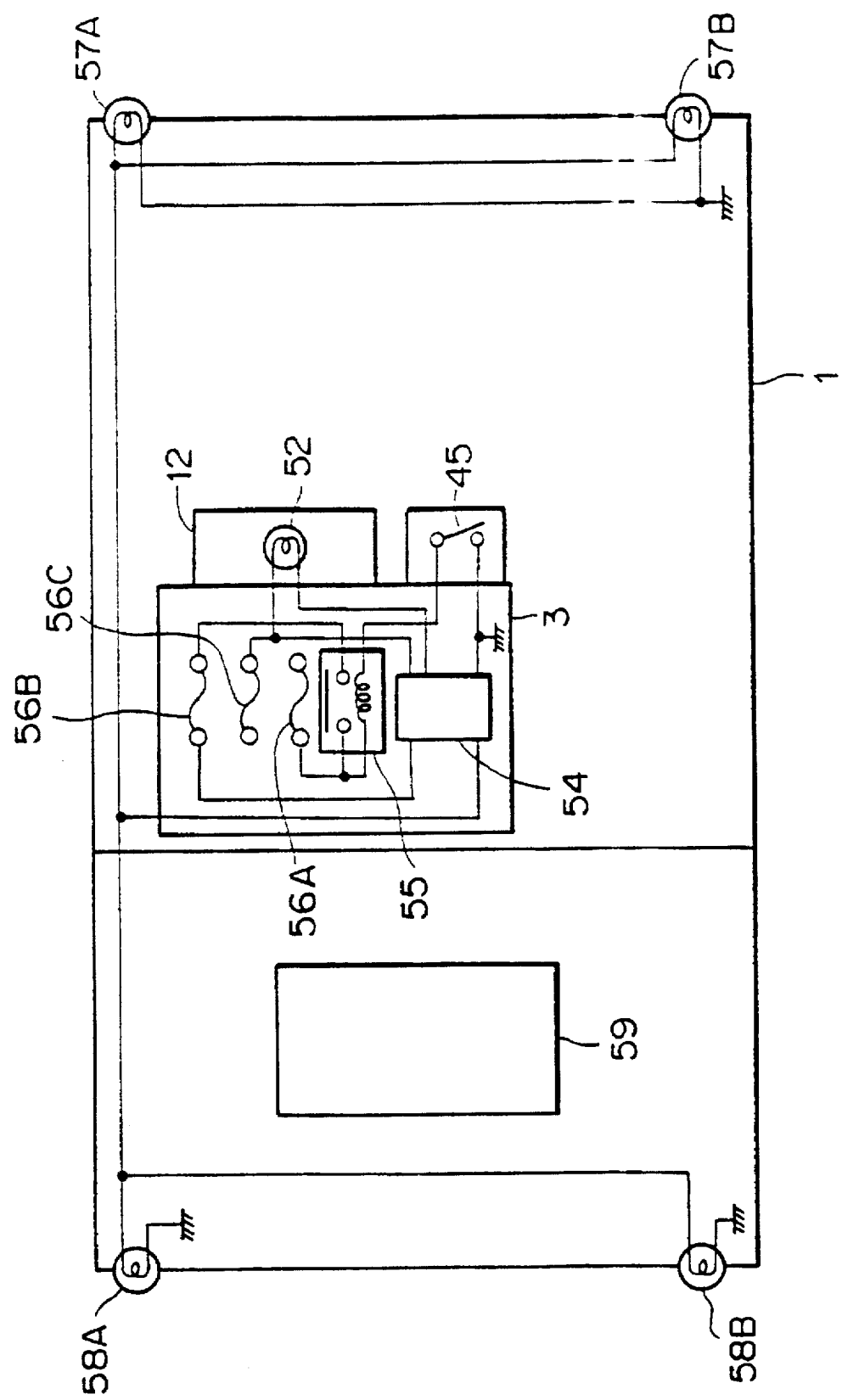
FIG. 15 is a wiring diagram to show an example of wiring inside car employing the meter module of the present invention.
Figure 36:
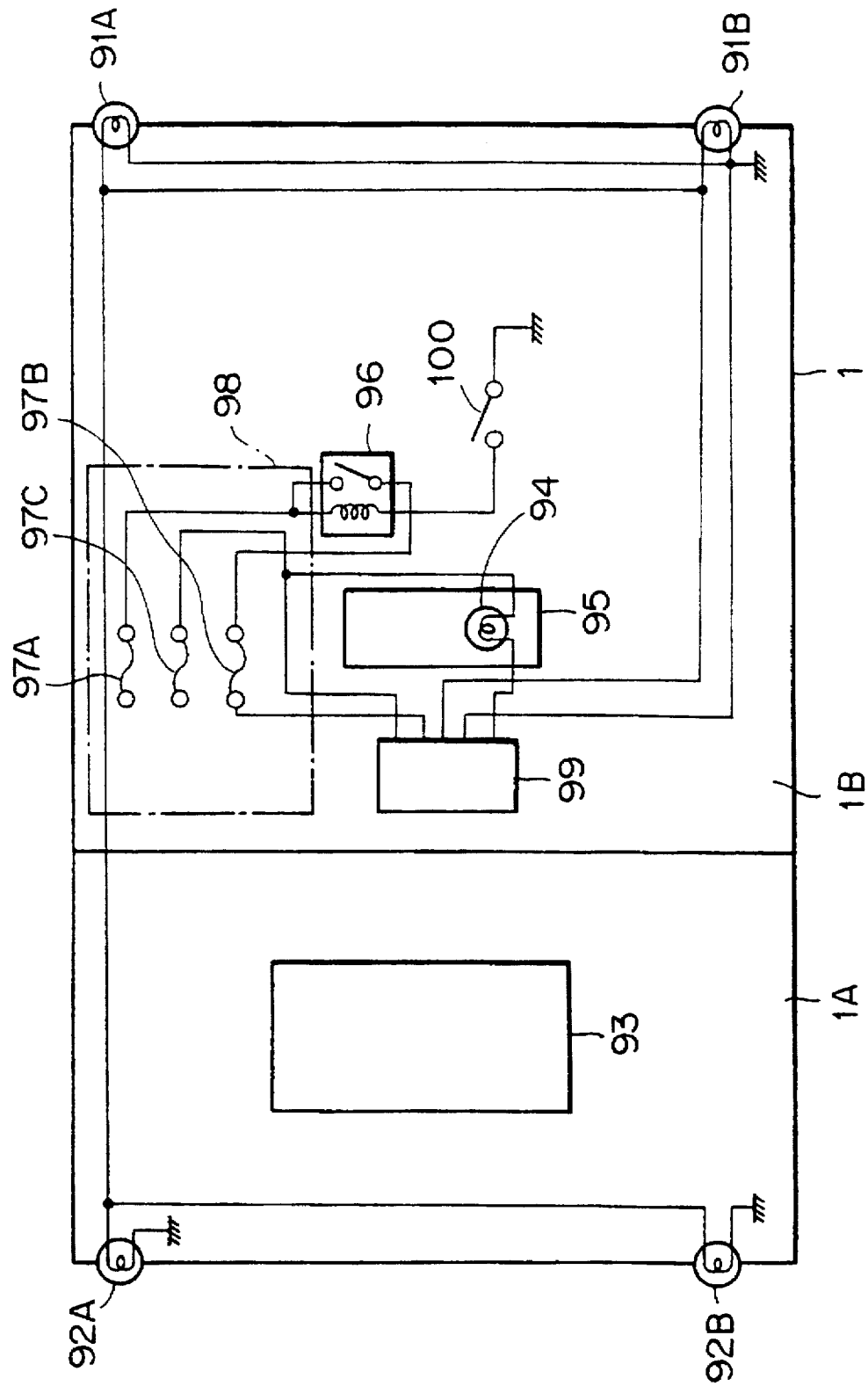
FIG. 36 is a wiring diagram to show a conventional wiring method corresponding to FIG. 15.

FIG. 15 is a wiring diagram of tail lamp system where the meter module 3 of the present invention is employed. Comparing FIG. 15 with FIG. 36 showing the conventional example, it is similarly apparent that the number of cables can be reduced, because the tail lamp breakage inspection relay 99, the tail relay 96 and fuses 97A to 97C are intensively set in a single meter module 3.

As clearly seen in the above embodiment, thermal influence can be advantageously minimized on the centralized control circuit board 14 and the printed-wiring board 13 on the back face of meter panel 12, because the electric junction box 15, which could have a considerable temperature rise due to heating upon current flow, is located at the shifted position toward one side of the module case 16. In addition, the circuit members such as the meter panel 12, the centralized control circuit board 14 and the electric junction box 15 can be formed in compact shape separately from the large cluster frame 5 having the console center, which advantageously facilitates the production and handling of the members.

Also, since the connectors 41, 46 and the J/B connector portions 21d, 21d' of the printed-wiring board 13, the centralized control circuit board 14 and the electric junction box 15 to the in-pane harness 8 are collectively provided as the in-pane harness connecting connector 21 in the module case 16 of meter module 3, the connector can be connected with the multipolar connector 10 of the harness 8 by a single operation (by screwing the bolt 57). Similarly, since the connection portion of in-pane harness 8 to the meter module 3 is formed as the screw-type multipolar connector 10 in which a plurality of connectors (the two separate connectors 55 and 56 in the present embodiment) are set together through the protector 7, the single operation is enough for connection, which can obviate troublesome operations to connect a number of connectors one by one within a limited space inside the instrument panel as in the conventional arrangement. Additionally, the separate connector 56 in the multipolar connector 10 is structured such that the elastic contact pieces 58a of connector terminal 58 are open toward the separate connector 55, i.e., free inside, which can avoid a damage upon contact with other devices in storage or in assembling.

Although the above description concerns an example in which the sub-wiring harness 18 is formed as a cable-collecting wiring harness with tape windings around ordinary cables, the sub-wiring harness may be formed as a so-called flat harness in which juxtaposed conductors such as ribbon lines or copper foils are insulation-coated on the both sides. Also, the drive circuits for meters and indication lamps may be set either on the printed-wiring board 13 of meter panel 12 or on the centralized control circuit board 14.

Further, the meter module 3 can easily be removed together with the cluster frame 5 from the instrument panel 2 and therefore the electric devices and instrument around the module 3 can be seen from the panel back face without taking the instrument panel 2 out from the body, facilitating the maintenance of peripheral instrument. Even if the meter panel 12 is different one from another or is partially modified depending upon the type or grade of car, the centralized control circuit board 14 can be commonly used as described above and a change only of the meter panel is enough, permitting quick treatment.

The first embodiment as shown in FIG. 1 to FIG. 15 was an example in which the bus-bar circuit board 28 was constructed of the flat bus-bars 26 arranged on the insulator board 27 as internal circuit constituting members of electric junction box 15, and in which the sub-wiring harness 18 having the connectors 19, 20 took over a part of the internal circuit. In this arrangement, the sub-wiring harness 18 is assembled from the back face of cluster frame 5 in assembling the meter module 3, which requires a step of assembling the sub-wiring harness 18. In addition, the arrangement of bus-bars 26 is still complicated in case of the bus-bar circuit board 28 of flat arrangement, which leaves a problem of being not always easy in design or change of circuit.

The second embodiment as shown in FIG. 16 to FIG. 23 solved the above problems, in which the internal circuit of electric junction box is formed by pressing a cable against a vertical bus-bar to simplify the circuit structure and to facilitate a modification and in which one end of sub-wiring harness is directly connected to the electric junction box.

Figure 16:
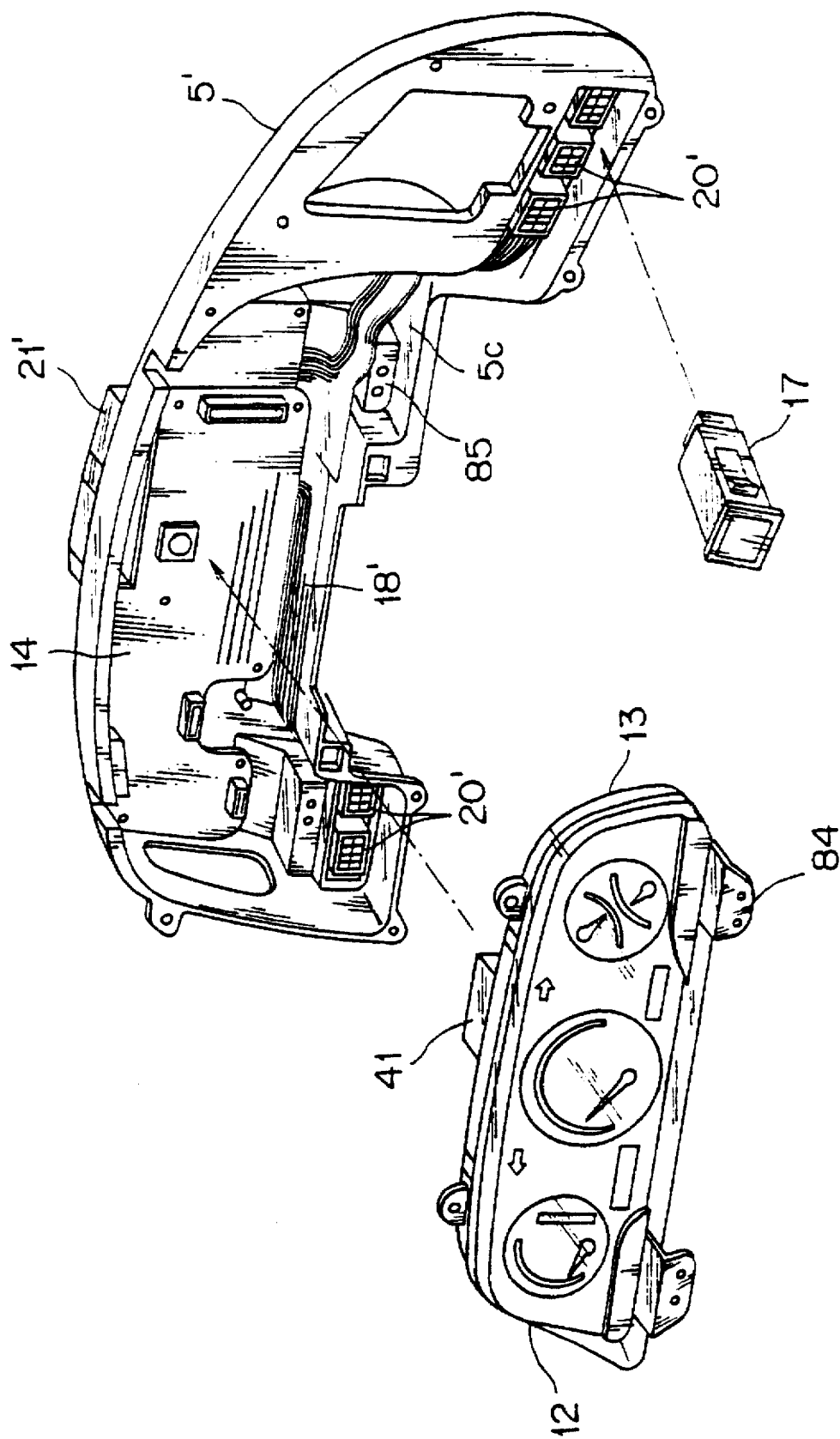
FIG. 16 is a perspective view to show an assembled state of a meter module to a cluster in another embodiment of the present invention.
Figure 17:
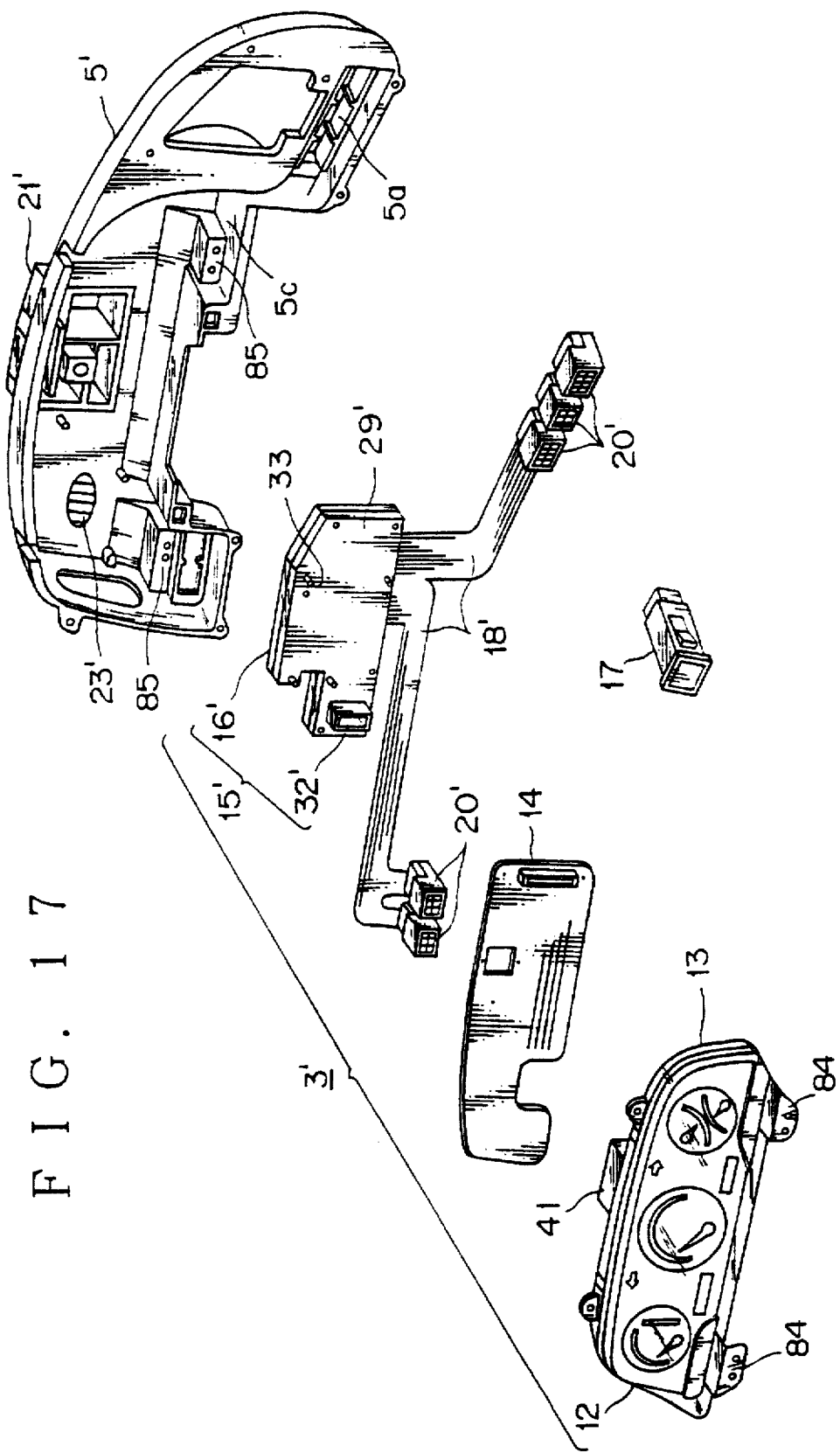
FIG. 17 is a perspective view to show a separate state of the meter module and the cluster as shown in FIG. 16.

In FIGS. 16 and 17, an electric junction box 15' constituting a meter module 3' is assembled and fixed together with a sub-wiring harness 18', directly connected thereto in a cluster frame 5'. Numeral 20' designates connectors for direct connection to devices at the end of sub-wiring harness 18', which are set in mounting openings 5a in the cluster frame 5'. A printed-wiring board 13 is fixed on the back face of meter panel 12 similarly as in the first embodiment.

Figure 18:
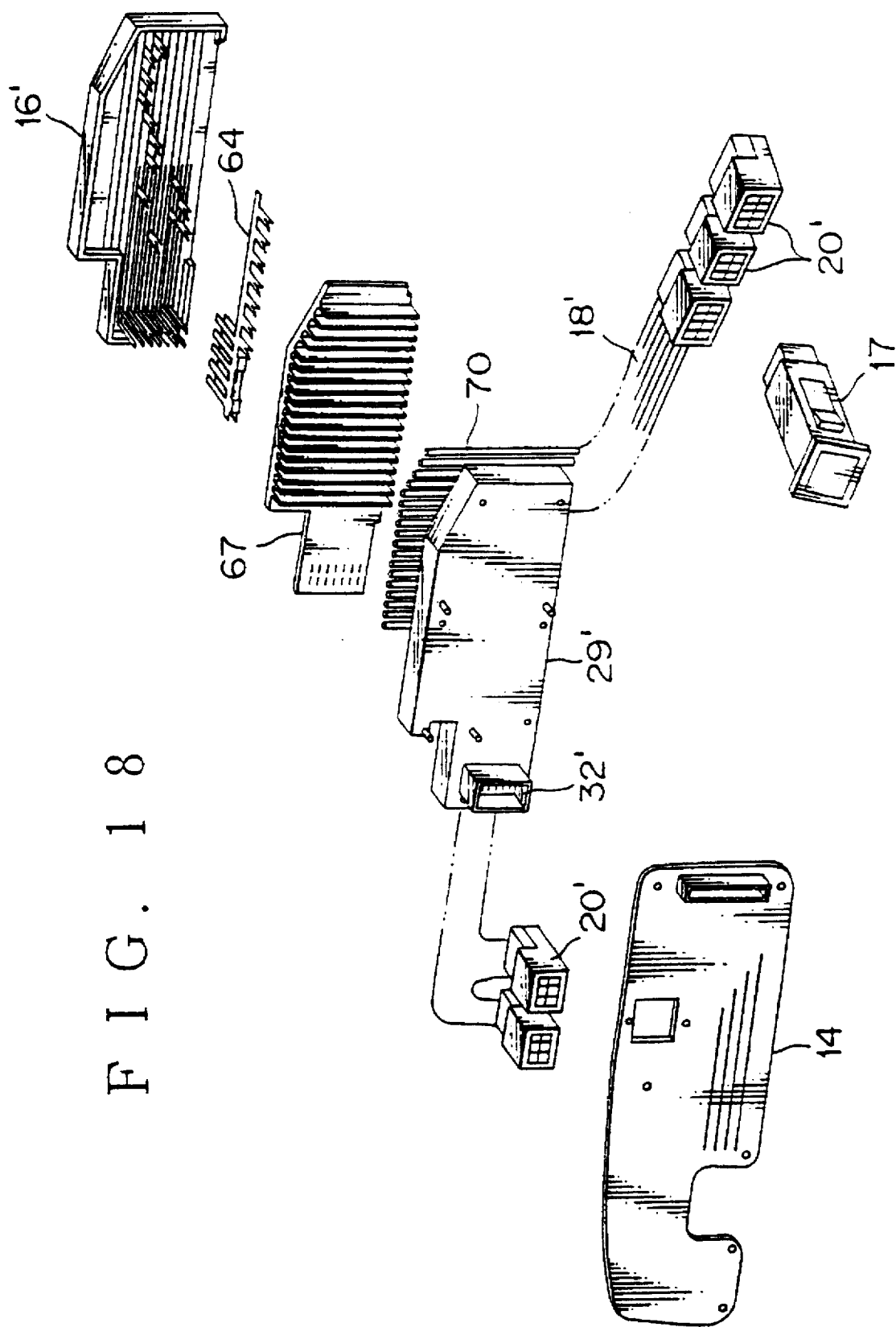
FIG. 18 is an exploded perspective view of an electric junction box and a centralized control circuit plate as shown in FIG. 17.

As shown in FIG. 17 and FIG. 18, the electric junction box 15' is composed of a module case 16', a plurality of so-called vertical bus-bars 64, a press-contact plate 67, a plurality of cables 70 and an insulator cover 29'.

The module case 16' is different from that in the first embodiment in that it does not have the in-pane harness connecting connector 21 and the vent holes 23 as in the first embodiment but instead the cluster frame 5' has an in-pane harness connecting connector 21' and vent holes 23' and in that the plurality of cables 70 constituting the sub-wiring harness 18' are connected at one end directly to the bus-bars 64 inside the electric junction box 15'. Also, a groove 5c for setting the sub-wiring harness 18' therein is provided inside the cluster frame 5' as extending along the lower edge thereof.

Figure 19:
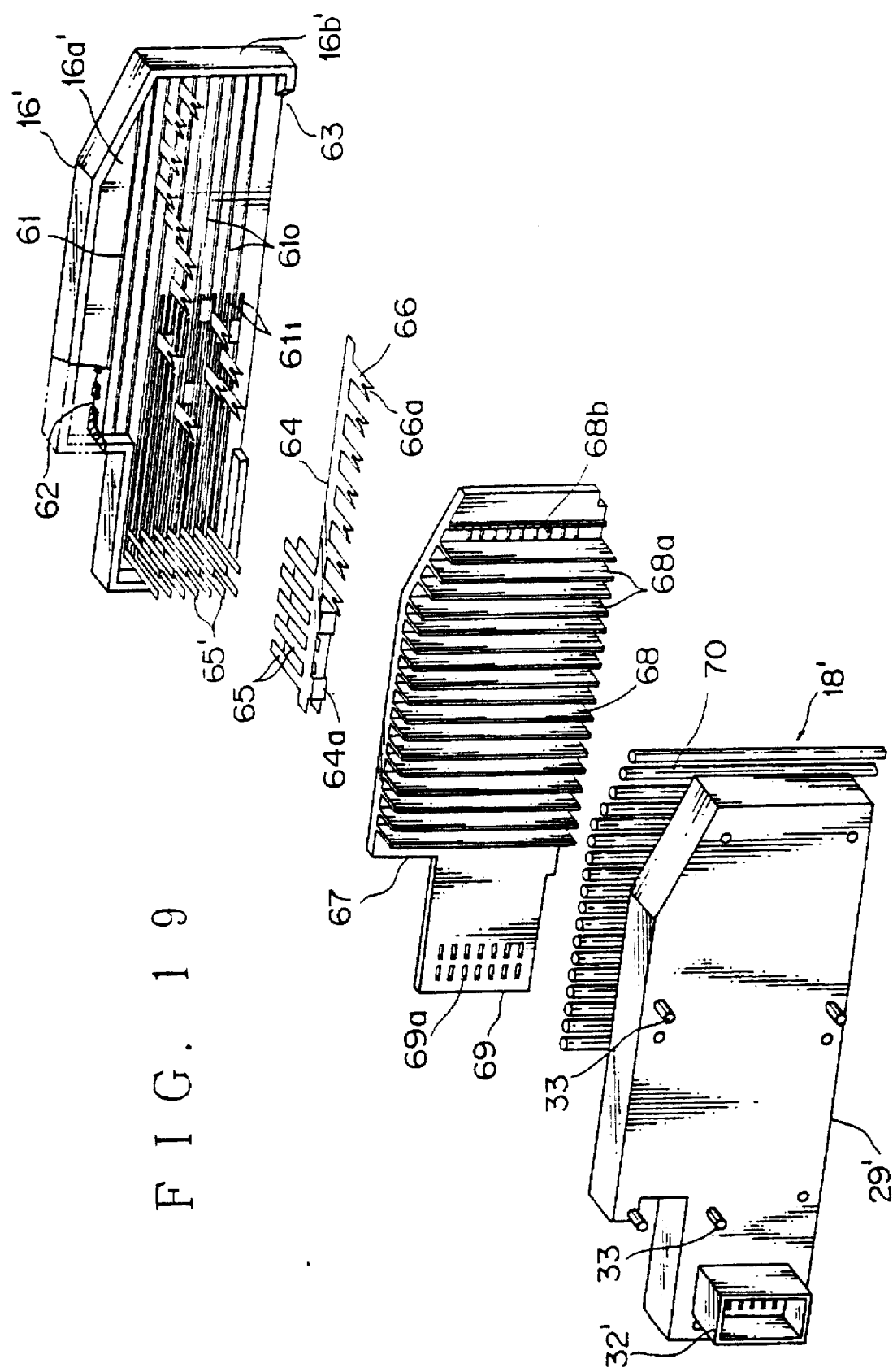
FIG. 19 is an enlarged and exploded perspective view of the electric junction box as shown in FIG. 17.

FIG. 19 is an enlarged perspective view of the electric junction box 15' as shown in FIG. 18.

There are provided a plurality of lateral grooves 61 and tab through holes 62 on a bottom wall 16a' of module case 16' and a cut-off portion 63 for leading cables out therethrough on the lower side of peripheral wall 16b'. The lateral grooves 61 include long lateral grooves $61_0$ and short lateral grooves 61₁ alternately arranged, which permit the bus-bars 64 as detailed below to be selectively used in accordance with the number of branches thereof.

A bus-bar 64 has tabs 65 as connector terminals at one end and press-contact pieces 66 each with an open slot 66a for cable press-in at the other end. The tabs 65 and the press-contact pieces 66 each extend in parallel with the plate surface of bus-bar 64. The tabs 65 extend in the opposite direction to the extending direction of the press-contact pieces 66, but may extend in the same direction as shown by numeral 65'. Also, the tabs 65 are formed in upper and lower rows through a bending connection piece 64a in a bus-bar 64.

The press-contact plate 67 has a cable guide portion 68 at one end side and a terminal fixing portion 69 on the other end side. The cable guide portion 68 includes a plurality of guide walls 68a juxtaposed at equal intervals and through holes 68b for the press-contact pieces 66. The terminal fixing portion 69 has a plurality of tab through holes 69a.

Figure 20:
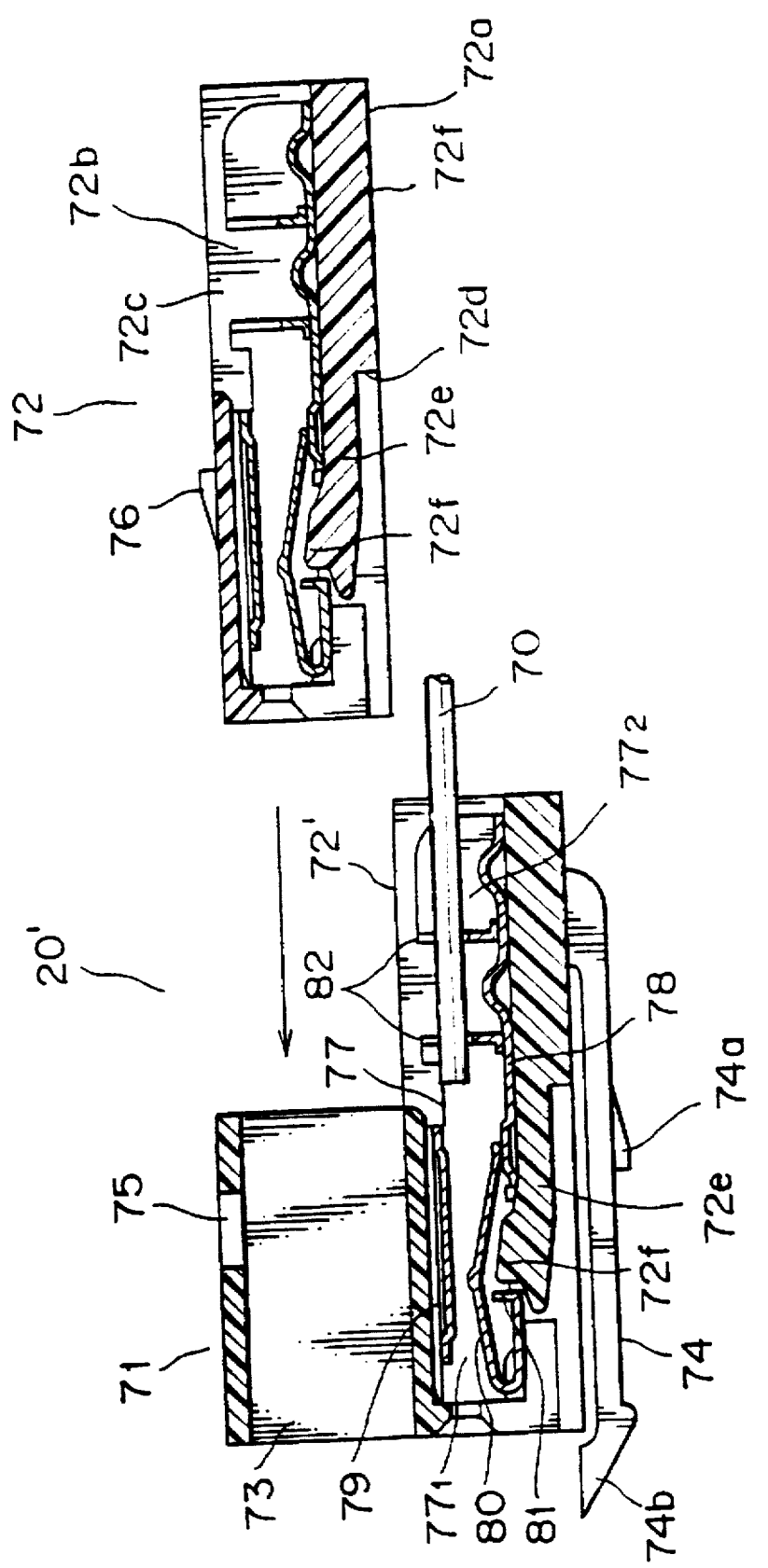
FIG. 20 is a longitudinal cross sectional view of a connector for direct connection to device as shown in FIG. 16.

Each connector 20' for direct connection to device is composed of a connector main body 71 and a detachable press-contact connector 72 as shown in FIG. 20. The connector main body 71 has a press-contact connector 72' in the lower step and a connector fitting portion 73 in the upper step. The press-contact connector 72 having a lock click 76 is fit and locked in the connector fitting portion 73. A flexible lock lever 74 projects from a peripheral wall of connector main body 71 on the lower press-contact connector 72' side and extends along the wall. A lock hole 75 to be engaged with the lock click 76 is provided on the upper connector fitting portion 73. The lock lever 74 has a stop click 74a in the middle portion, which is to engage with a stop hole 83 (see FIG. 21) of fitting opening 5a in the cluster frame 5'. Also, the lock lever 74 has a tongue 74b at the fore end.

A plurality of terminal receiving rooms 72b are horizontally juxtaposed in the housing 72a of the press-contact connector 72. Each terminal receiving room 72b has an opening 72c in the rear half of peripheral wall thereof and a flexible stop arm 72e extending forward through a step portion 72d in the inner wall on the opposite side to the opening 72c.

Numeral 77 denotes a female terminal, which has an electric contact portion 77₁ for an associated male terminal (not shown) at the front end of a base 78 and a cable press-contact portion 77₂ at the rear end. The electric contact portion 77₁ has a receiving portion 79 for receiving the male terminal and an elastic tongue 80 formed by bending the base 78. The elastic tongue 80 is provided with a stop hole 81. A pair of press-contact pieces 82, 82 stand in the wire press-contact portion 77₂ in the same structure as the press-contact piece 66 having the slot 66a.

The assembling operation of meter module 3' is next described.

The electric junction box 15' is first assembled. As shown in FIG. 19, the bus-bars 64 are set in the lateral grooves 61 (61₀, 61₁) in the module case 16', so that the tabs 65 are inserted through the tab through holes 62 of bottom wall 16a' in the case 16' to project out of the back face. The tabs 65' are arranged on one side of the case 16' and the press-contact pieces 66 on the other side. Then, the press-contact plate 67 is set over the case, so that the tabs 65' come through the tab through holes 69a and the press-contact pieces 66 through the through holes 68b between two guide walls 68a and 68a out of the front face. In this state, one end of cable 70 is set between the guide walls 68a and 68a and is pressed to contact a slot 66a in each press-contact piece 66 by an unrepresented jig. This connects cables 70 constituting the sub-wiring harness 18' directly with the bus-bars 64 as inner circuit in the electric junction box 15'. After the press-contact of cables is finished, an insulator cover 29' is set over the module case 16' and is fixed thereto by screws.

Connectors 20' for direct connection to devices are set at the other end of cables 70. As shown in FIG. 20, the female terminal 77 is inserted into a corresponding terminal receiving room 72b in the lower press-contact connector 72' of connector main body 71 so as to engage a protrusion 72f of the flexible stop arm 72e with the stop hole 81 to stop there. In this state, the other end of each cable 70 is brought into press-contact with the paired press-contact pieces 82, 82 similarly as above through the opening 72c in the rear half of housing 72a. Similarly, the press-contact connector 72 is assembled and inserted into the upper connector fitting portion 73 in the connector main body 71 so as to engage the lock click 76 with the lock hole 75 to lock them.

The above procedure completes the assembling of the electric junction box 15' with the internal circuit to which the sub-wiring harness 18' having the connectors 20' for direct connection to devices at the end is directly connected. It is of course possible that in FIG. 19, before one end of cable 70 is pressed to contact a bus-bar 64, the other end may be preliminarily press-contacted with a female terminal 77 of connector 20' for direct connection to device.

Next, the meter panel 12 provided with the centralized control circuit board 14 and the printed-wiring board 13 on the back face is incorporated with the electric junction box 15' with the sub-wiring harness 18' in the same manner as in the first embodiment to complete an assembly of meter module 3'. A connector 32' for centralized control circuit board in the insulator cover 29' in the electric junction box 15' is connected to a J/B connection terminal 47 of centralized control circuit board 14 similarly as in FIG. 8.

The thus assembled meter module 3' is incorporated with a cluster frame 5' in the same manner as in the first embodiment.

As shown in FIG. 17, the meter module 3' is set in the cluster frame 5' and then fixed therewith in such a state that the tabs 65 of electric junction box 15' and the in-pane harness connection connector 41 of the printed-wiring board 13 are set in the in-pane harness connection connector 21' integral with the cluster frame 5' (see FIG. 7). Then, the sub-wiring harness 18' is set in the groove 5c formed in the cluster frame 5'. In FIG. 17, numeral 84 designates mounting plates provided on the meter panel 12, and 85 seats provided in the cluster frame 5'. The meter panel 12 is fixed on the seats 85 by screws.

Figure 21:
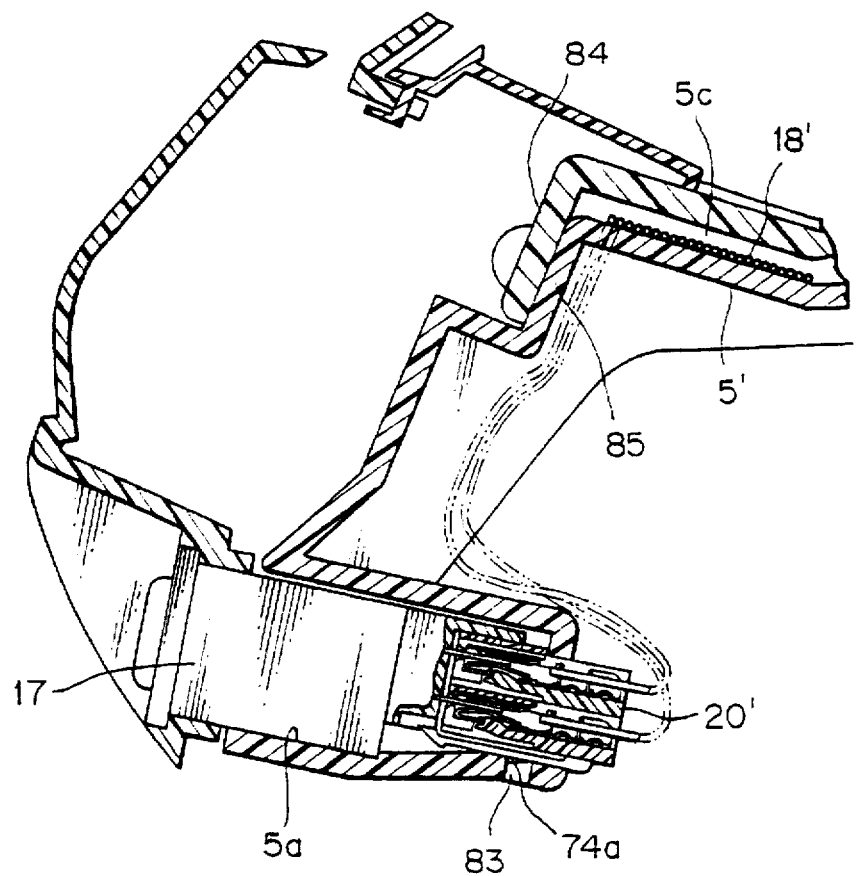
FIG. 21 is a cross sectional view of major part to show an assembled state of the connector for direct connection to device as shown in FIG. 16 on a cluster.

Then, as shown in FIG. 21, each connector 20' for direct connection to device is inserted into a corresponding mounting opening 5a from the front face side of cluster frame 5' until the stop click 74a of lock lever 74 engages with the stop hole 83 to make lock.

The direct connection connector 20' can be easily removed from the cluster front surface by lifting up the fore end tongue 74b of lock lever 74 by a finger. Similarly, a switch 17 can be easily connected with the connector 20' by inserting it from the front surface side.

Figure 22:
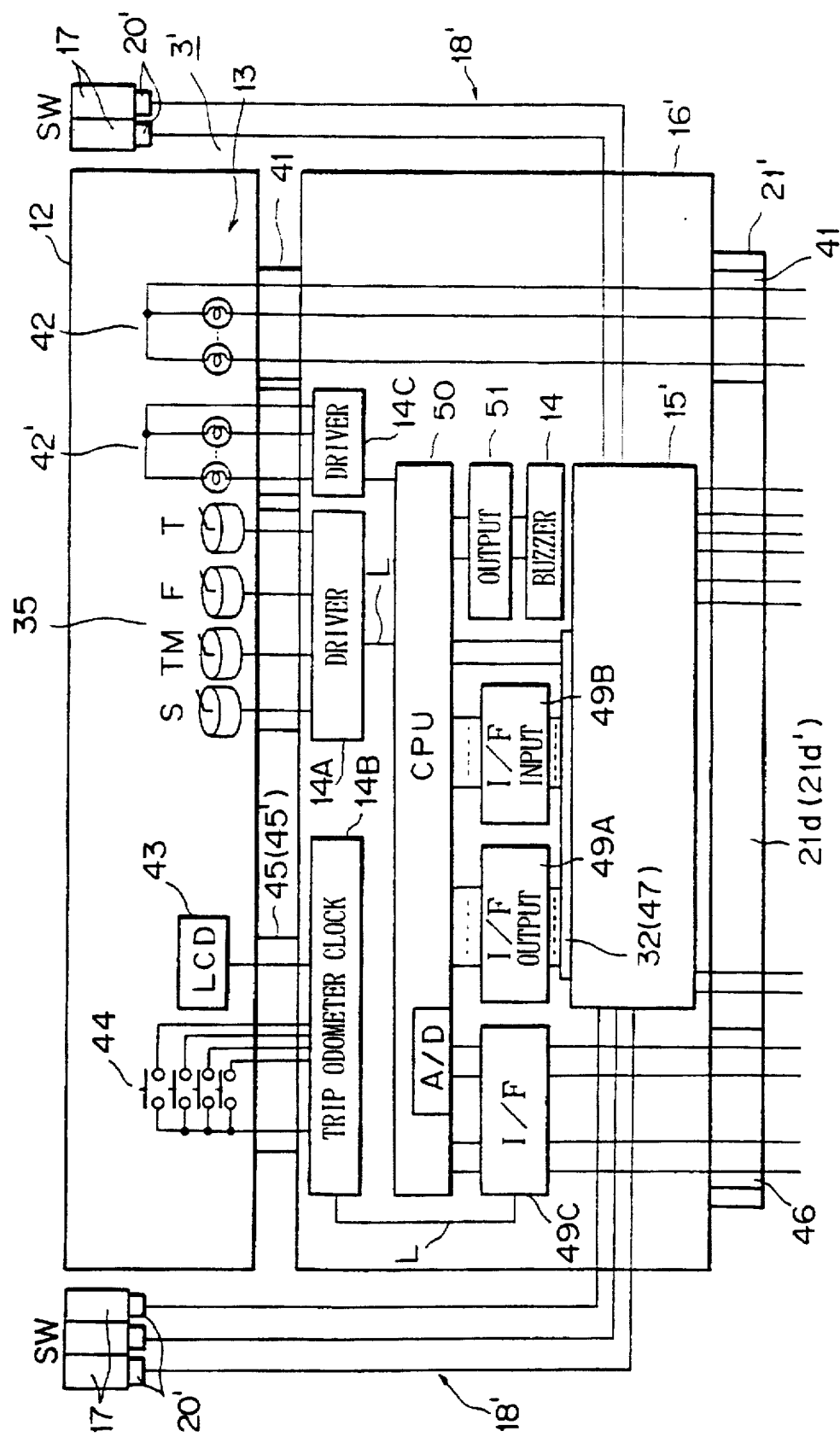
FIG. 22 is a block wiring diagram of the meter module as shown in FIG. 16.
Figure 25:
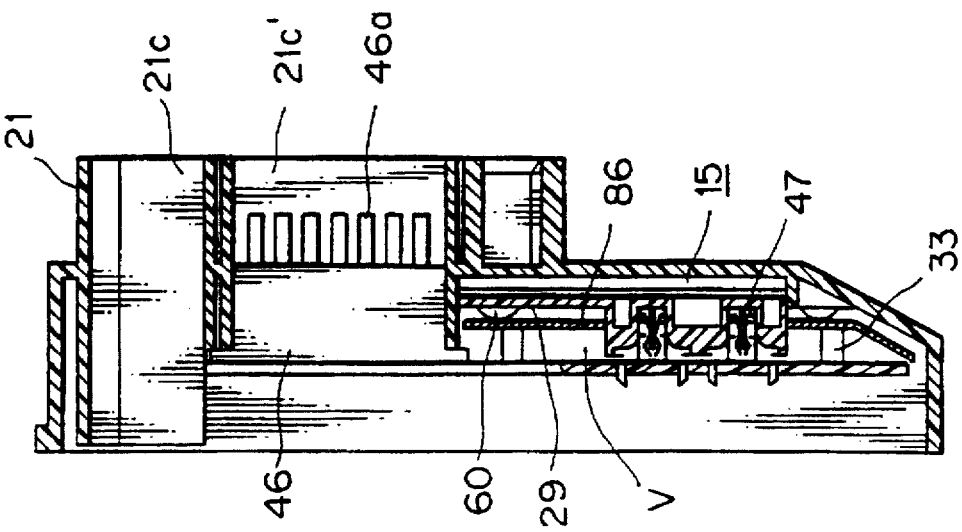
FIG. 25 is a cross sectional view to show a partial assembled state of a cable connection portion and a centralized control circuit plate.
Figure 23:
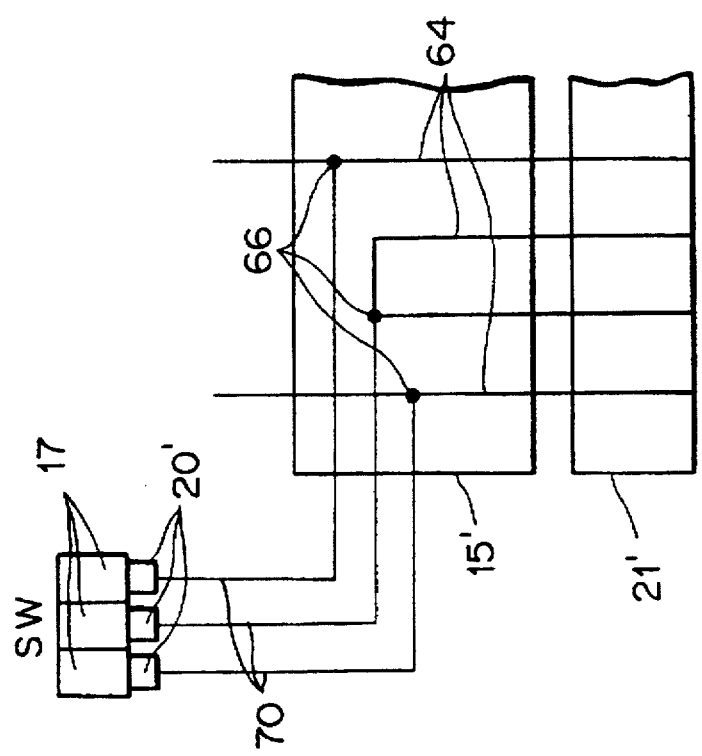
FIG. 23 is a wiring diagram to show an example of connection between a bus-bar as an internal circuit in the electric junction box as shown in FIG. 17, and a switch.

FIG. 22 is a block wiring diagram of the meter module 3', and FIG. 23 a wiring diagram to show an example of connection between a bus-bar 64 as inner circuit in the electric junction box 15' and a switch 17. FIG. 22 is different from FIG. 14 in that the direct connection connector 20' connected to the switch 17 is directly connected to the electric junction box 15' through the sub-wiring harness 18' (cable 70).

In the second embodiment, the inner circuit in the electric junction box 15' is formed by the so-called vertical bus-bars 64 having the press-contact pieces 64, which makes the circuit design or a partial modification easier. Also, the sub-wiring harness 18' can be produced together in the assembling line of the electric junction box 15', which makes the process control easier. Further, the harness 8' can be set from the front surface side of cluster frame 5', which makes the operation easier and which could omit a harness assembling step in a plant of car maker.

The second embodiment was described as an example in which the in-pane harness connection connector 21' and the vent holes 23' were integrally provided in the cluster frame 5', but there occurs no inconvenience even if they are provided in the module case 16' similarly as in the first embodiment. Also, the internal circuit in the electric junction box 15' does not always have to be composed of the vertical bus-bars 64. The internal circuit may be constructed using both the bus-bars 64 and the plane bus-bar circuit board 28 in the first embodiment. The point is that the internal circuit is connected directly with the one ends of cables 70 constituting the sub-wiring harness 18'.

In the first and second embodiments, the meter module 3, 3' is so arranged that an appropriate space V is interposed by the spacers 33 between the electric junction box 15, 15' including the bus bars 26, 64 and the centralized control circuit board 14. When a load such as a head lamp, a wiper, or a power window is operated during run of car, that is, when a load is forced on the bus-bars 26, 64, they could heat or generate electromagnetic waves, which could negatively affect the centralized control circuit board 14 adjacent thereto.

Figure 24:
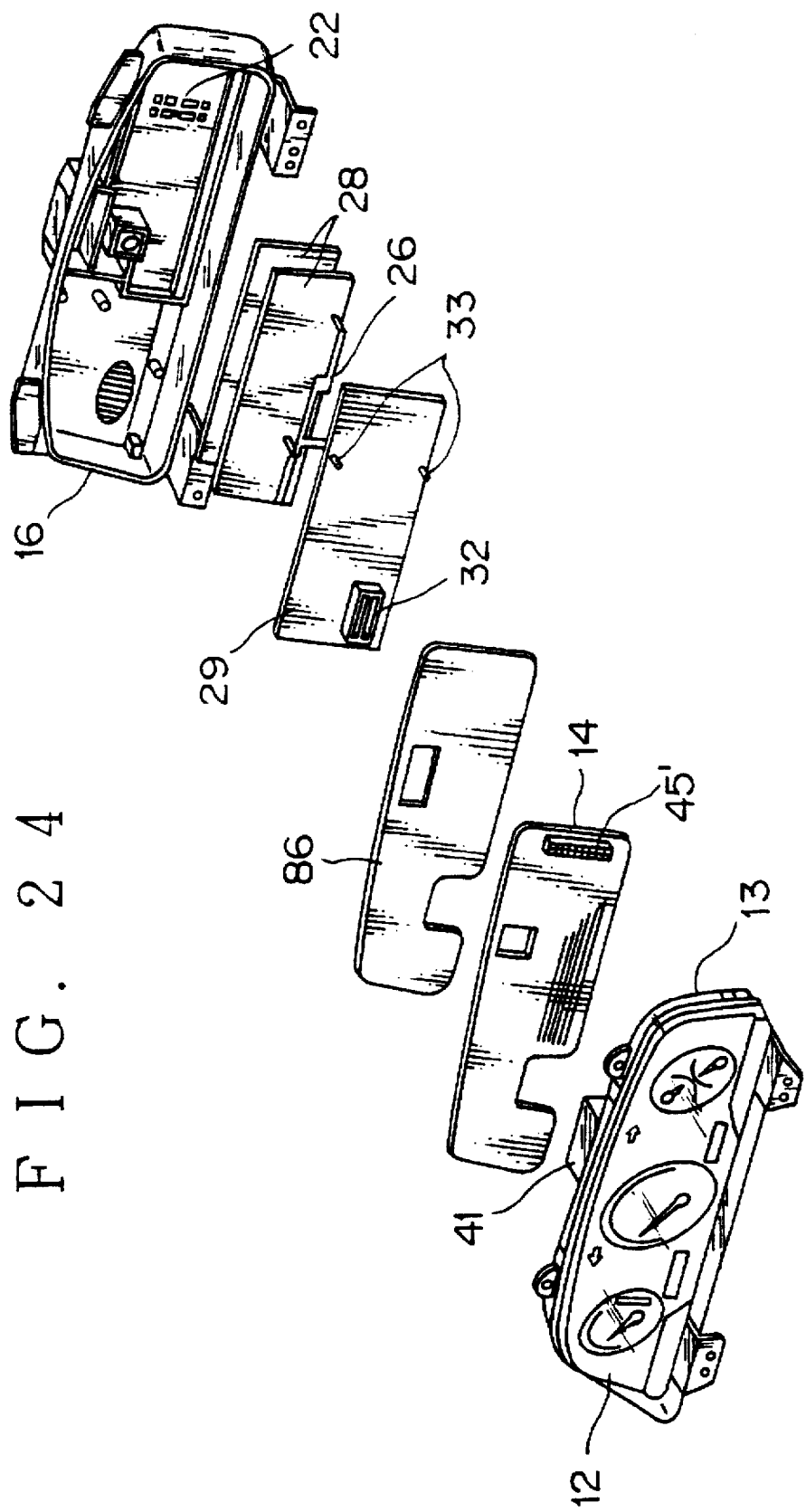
FIG. 24 is an exploded perspective view to show a modification of the meter module as shown in FIG. 3.
Figure 26:
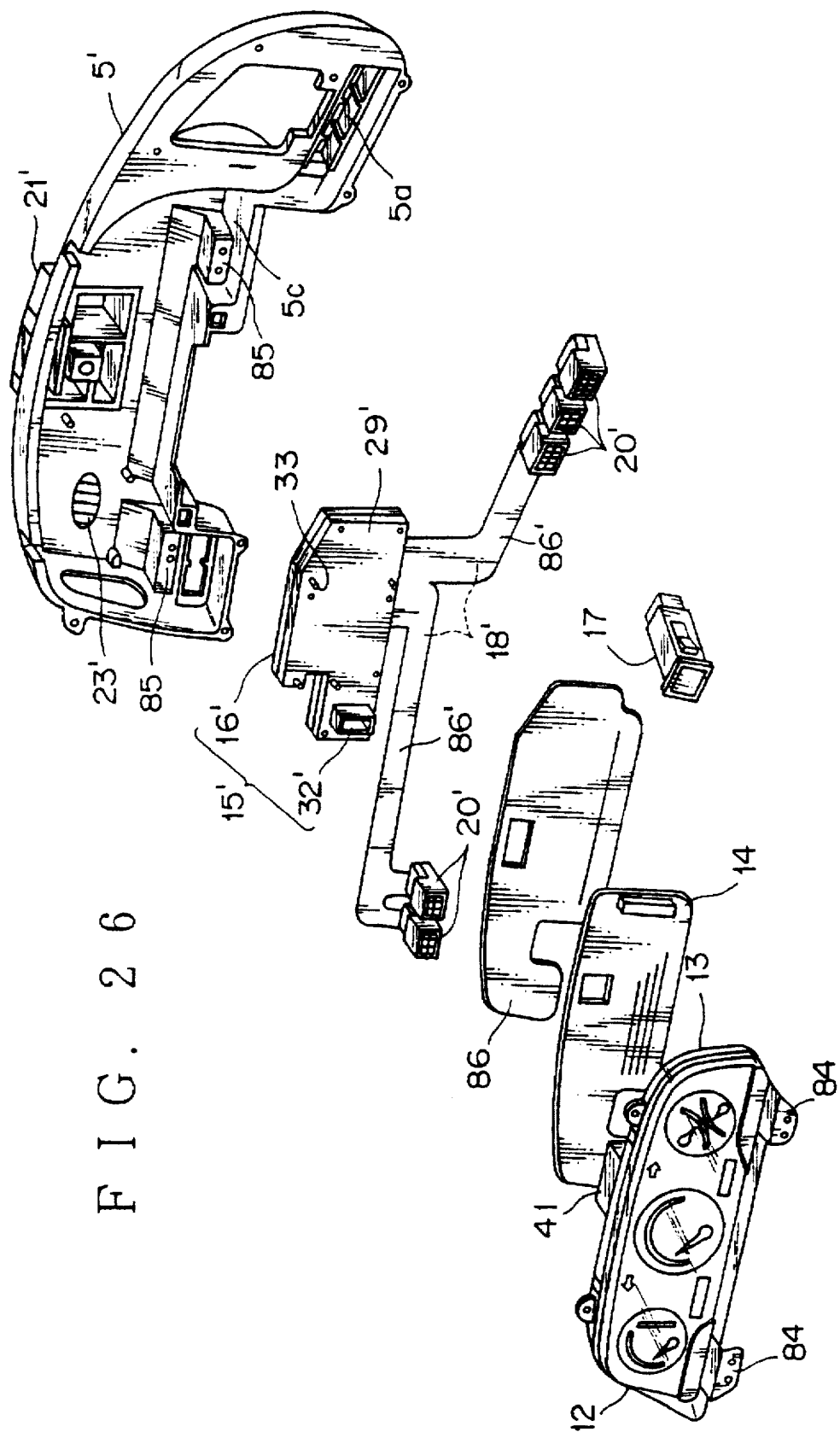
FIG. 26 is an exploded perspective view of major part to show a modification of the meter module as shown in FIG. 17.

Embodiments as shown in FIG. 24 and in FIG. 26 are so arranged that a plate shield member 86 is interposed between the centralized control circuit board 14 and the electric junction box 15 in the meter module 3. The shield member 86 is a metal plate for example of aluminum or copper in these embodiments. However, in case high-thermal resistance is not required or in case flexibility or weight reduction is necessary, a flexible metal foil such as FPC may be employed.

FIG. 26 shows an example in which a shield member 86 is interposed between the centralized control circuit board 14 and the electric junction box 15', and the sub-wiring harness 18' is also covered by a shield member 86' made of the metal foil. The reason why the sub-wiring harness 18' is covered by the shield member 86' is that the harness 18' is present in the cluster frame 5' as passing near the centralized control circuit board 14.

In the embodiments as shown in FIG. 24 and in FIG. 26, the entire electric junction box 15 or 15' may be arranged to be covered by a shield member.

The installation of shield member 86, 86' as described above can shield the heat and electromagnetic waves generated by the electric junction box 15, 15', increasing the reliability of the centralized control circuit board 14.

FIG. 4 shows an example in which a single multipolar connector 10 is provided in the wiring harness protector 7 of in-pane harness 8. There are, however, cases requiring two or more multipolar connectors 10, if the functions in the meter module 3 are expanded or if the connectors are desired to be separated for respective systems.

Since such multipolar connectors 10 will be fixed on the rigid protector 7, their positions and a gap therebetween are determined in the production process of wiring harness. On the other hand, the harness connection connectors are mounted on the bus-bars in the connector or on FPC in the meter module 3, 3', which determines the connector pitch. It is thus difficult to employ a movable arrangement for absorbing a positional deviation.

Then, there could occur cases where the positions of connectors cannot match with each other to fail to achieve electric connection therebetween, when a wiring harness protector with a plurality of multipolar connectors is connector-connected with a corresponding meter module.

Figure 27:
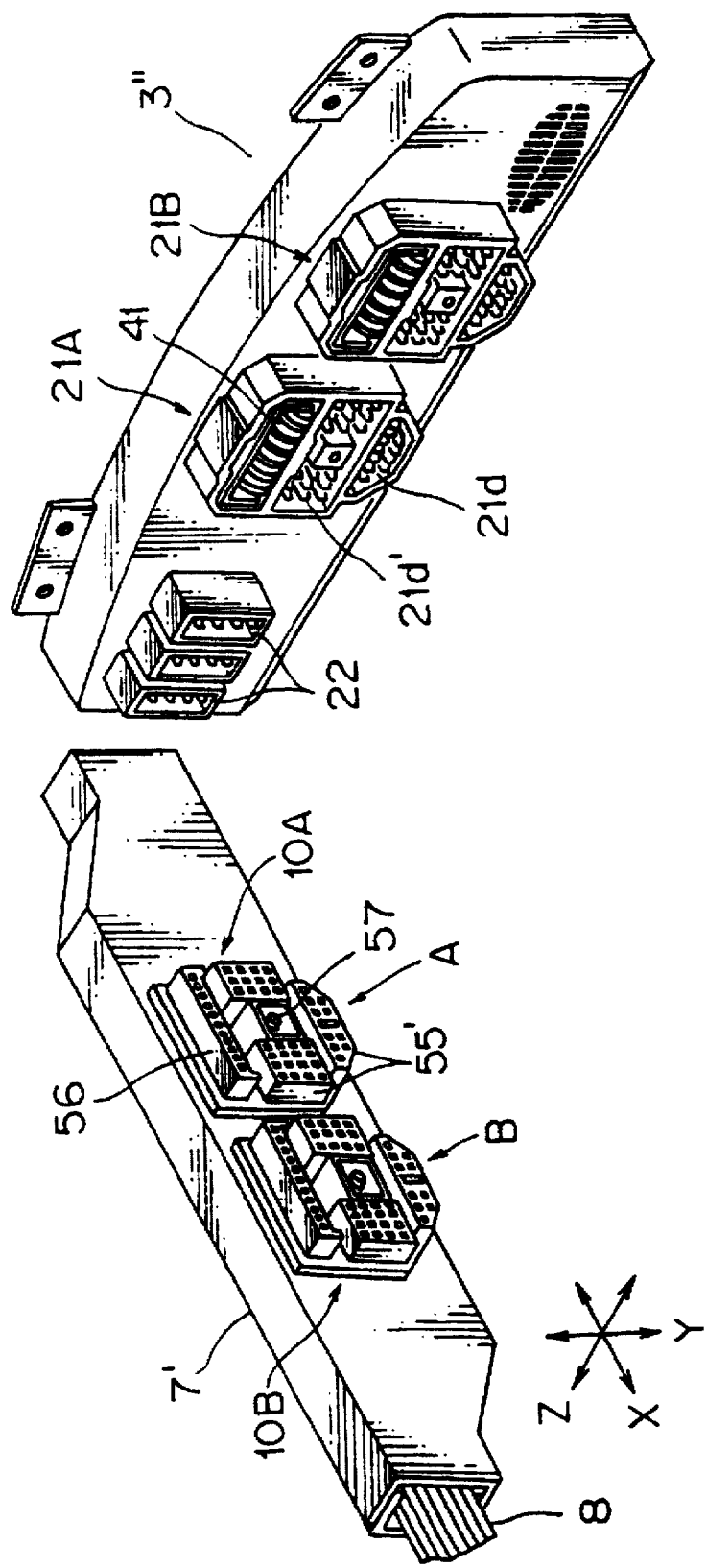
FIG. 27 is a perspective view to show another connection arrangement of the meter module as shown in FIG. 4 and instrument panel harness.

FIG. 27 shows an example in which two multipolar connectors 10A, 10B are provided in juxtaposed relation on the wiring harness protector 7' and two in-pane harness connection connectors 21A, 21B are also provided in juxtaposed relation on the meter module 3". The connectors 10A, 10B are arranged as rectilinearly movable in the directions Z and horizontally and vertically in the directions X and Y relative to the protector 7'. This arrangement requires no high-precision positioning for the connector pitch on the meter module 3" side, facilitating the assembling of the protector and the meter module and improving the reliability of electric connection.

Figure 28:
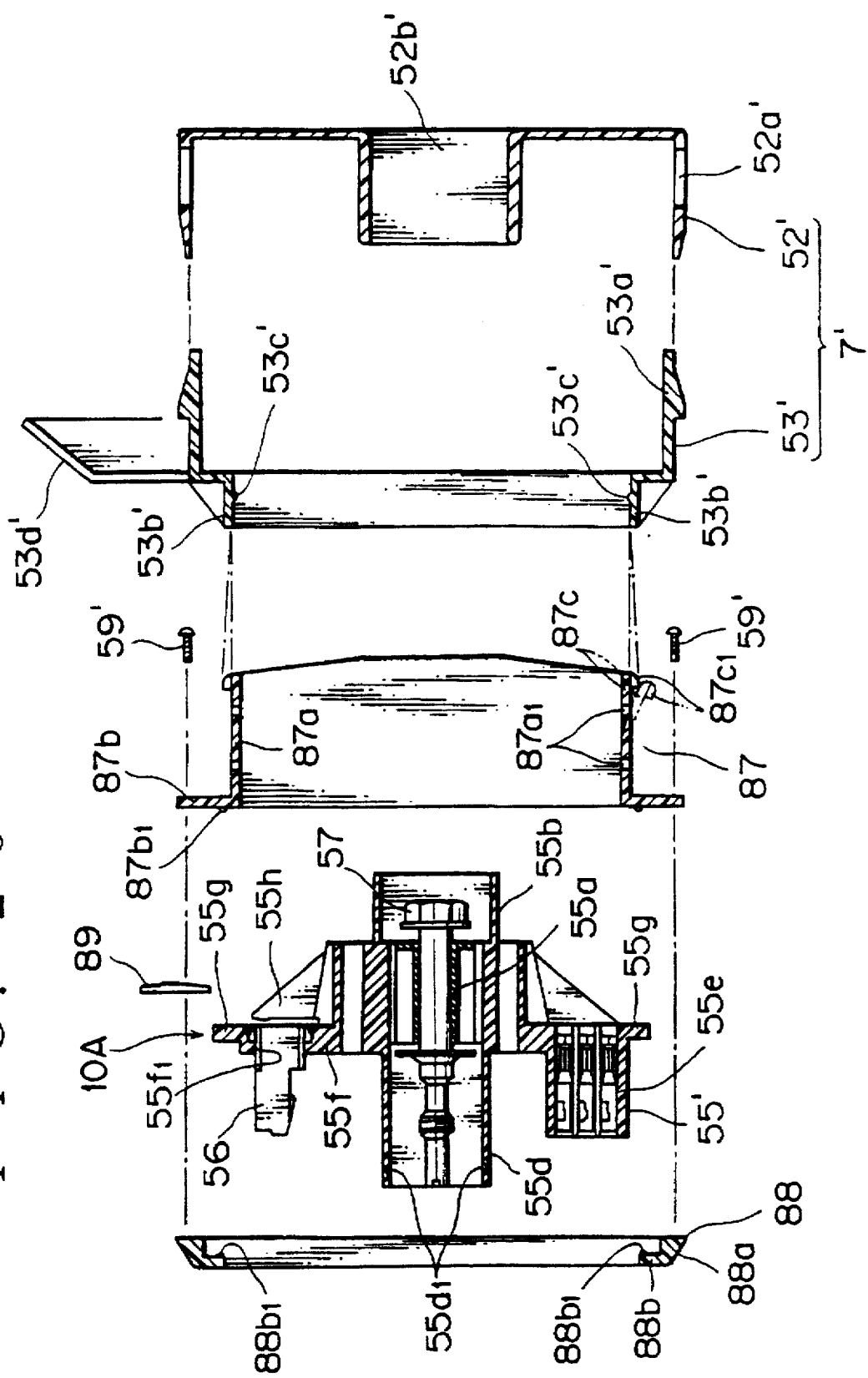
FIG. 28 is a cross sectional view to show a separate state of a wiring harness protector as shown in FIG. 27.

FIG. 28 is an exploded cross sectional view to show a mounting relation of a multipolar connector 10A to the protector 7'. Since another multipolar connector 10B has the same structure as the multipolar connector 10A, the following description mainly concerns the multipolar connector 10A.

The protector 7' is composed of a protector main body 52' and a cover 53' therefor, which are provided with locking means composed of stop holes 52a' and stop clicks 53a'. The protector main body 52' is given an opening frame 52b' for screwing a bolt.

The above arrangement is the same as that of the protector 7 as described before. The cover 53' has a guide frame 53b' for supporting the multipolar connector 10A in a rectilinearly movable manner, and a mounting bracket 53d'. Projections 53c' for tentative fixation are provided on the inner surface of guide frame 53b'.

The multipolar connector 10A is composed of two components of separate connectors 55', 56 in the same manner as the multipolar connector 10 shown in FIG. 12. In the separate connector 55' of the present embodiment, a holding plate portion 55f having a fitting opening 55f₁ for the separate connector 56 is integrally formed with a bolt insertion portion 55a, and a flange 55g is provided on the circumference. Also, stop holes 55d₁ for tentative stop are provided in a bolt fitting portion 55d in front of the bolt insertion portion 55a.

Figure 29:
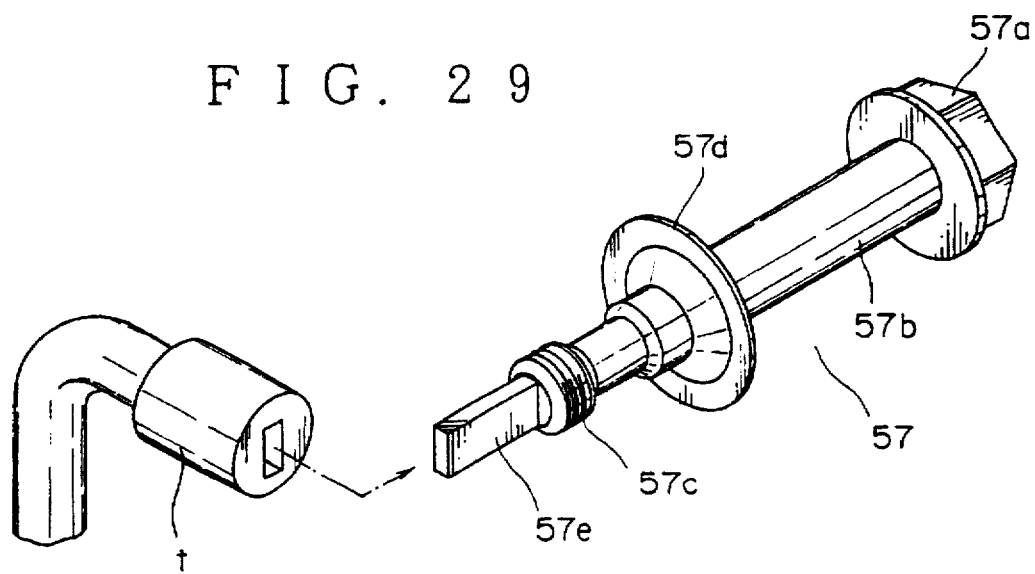
FIG. 29 is a perspective view of a bolt as shown in FIG. 28.

Further, a bolt 57 inserted into the separate connector 55' has an engagement end 57e of rectangular cross section at the fore end of front portion 57c, as shown in FIG. 29. The engagement end 57e may fit in a tool t.

The above multipolar connector 10A is supported in a slide magazine composed of a set of connector holder 87 and holder cover 88 and is set in the guide frame 53b' as slidable back and forth.

The connector holder 87 is constructed such that a flange receiver 87b is provided on the circumference at one end of a main body 87a of square tube, that a plurality of flexible stop pieces 87c are formed through unrepresented slits on the side wall at the other end, that tentative stop holes 87a₁ to be engaged with the projections 53c' are formed on the main body portion 87a, and that a stop click 87c₁ is formed to project at the fore end of each flexible stop piece 87c.

The holder cover 88 is a frame member having a nearly L-shaped cross section, which has a taper 88a on the outer circumference. Small semispherical projections $88b_1$ and $87b_1$ are provided on the inner surface of connector stopper $88b$ and on the outer surface of the flange receiver $87b$, respectively. Also, numeral 89 is a connector stop plate.

Next described referring to FIG. 30 to FIG. 35 are mounting of the multipolar connectors 10A, 10B to the protector 7' and assembling thereof with the meter module 3".

The multipolar connector 10A is assembled such that the separate connector 56 is first made to fit in the fitting opening $55f_1$ of holding plate portion $55f$ in the separate connector 55' and the connector stop plate 89 is stuck into a gap between the back face of separate connector 55' and a rib $55h$ to fix it.

Then, the rear half of the thus assembled multipolar connector 10A is set in the connector holder 87 and the holder cover 88 is set thereon while keeping the flange $55g$ in a butt contact with the flange receiver $87b$. They are fixed by screws 59'. By this procedure, the flange $55g$ of multipolar connector 10A is pinched between the connector holder 87 and the holder cover 88 constituting the slide magazine, that is, between the flange receiver $87b$ and the connector stopper $88b$, forming a slide mechanism.

Figure 31A:
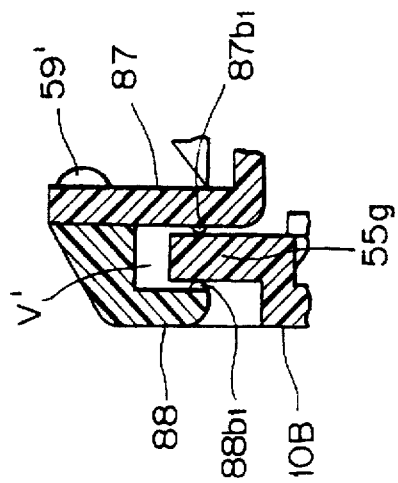
FIG. 31A is an enlarged cross sectional view of major part to show a movable structure of a multipolar connector 10A as shown in FIG. 30.

As shown in the enlarged drawing in FIG. 31A, there is a suitable space V' between the end face of flange $55g$ and the holder cover 88, and the flange $55g$ of multipolar connector 10A is supported on the both faces thereof by the small semispherical projections $88b_1$ and $87b_1$ with a small frictional resistance. Therefore, the flange $55g$ can move in the vertical directions and in the directions perpendicular to FIG. 31A (in the X and Y directions in FIG. 28).

Figure 31B:
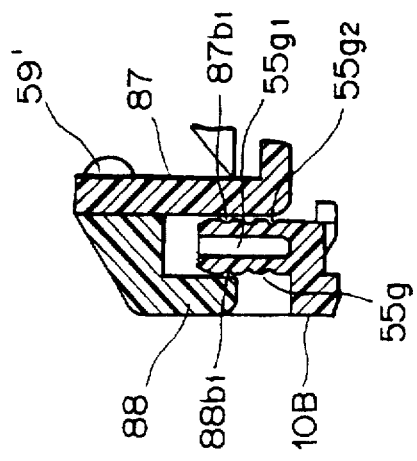
FIG. 31B is a cross sectional view to show another embodiment of the movable structure.

FIG. 31B shows a modification of the flange which can permit smooth movement in the X and Y directions. In the modification, a notch $55g_1$ extends from the end face of flange $55g$ to provide the flange $55g$ with flexibility and elasticity, and a plurality of small recesses $55g_2$ are provided on one surface or on the both surfaces of flange $55g$ as engageable with the small projections $88b_1$ ($87b_1$). The notch $55g_1$ and the small recesses $55g_2$ may be employed in combination as shown, or either one of them can be used alone.

Figure 30:
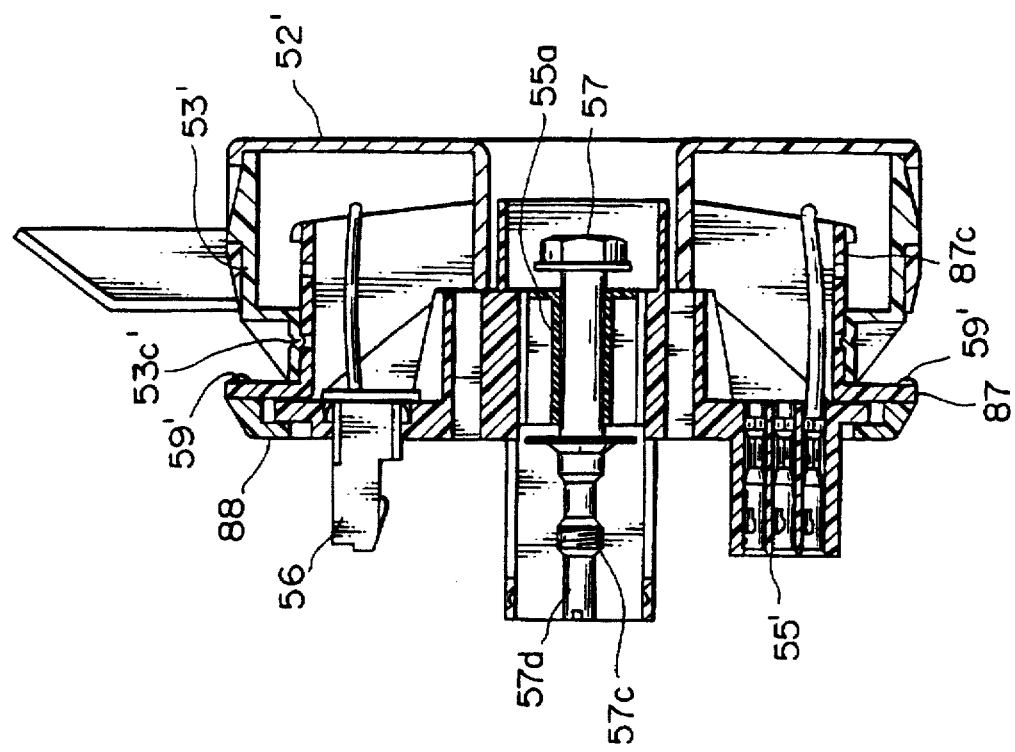
FIG. 30 is a cross sectional view to show an assembled state of the wiring harness protector as shown in FIG. 28.

Then, as shown in FIGS. 28 and 30, the main body portion $87a$ of slide magazine with the multipolar connector 10A set therein is inserted into the guide frame $53b'$ of protector 7' up to the deep end to incorporate the multipolar connector 10B with the protector 7'

In inserting the main body portion $87a$ into the guide frame $53b'$, the flexible stop pieces $87c$ are once bent toward the inside and elastically return when they pass over the guide frame $53b'$. Then, the projections $53c'$ of guide frame $53b'$ engage with the tentative stop holes $87a_1$ in the main body portion $87a$ as shown, whereby the multipolar connector 10A is tentatively fixed on the protector 7', In connector connection of the protector 7' onto the meter module 3", the multipolar connector 10B on the B side is vertically and horizontally moved by the slide mechanism, using the multipolar connector 10A on the A side (see FIG. 27) as the reference of assembling position, to temporarily fix the multipolar connectors 10A, 10B on the both A and B sides to the meter module 3".

Figure 32:
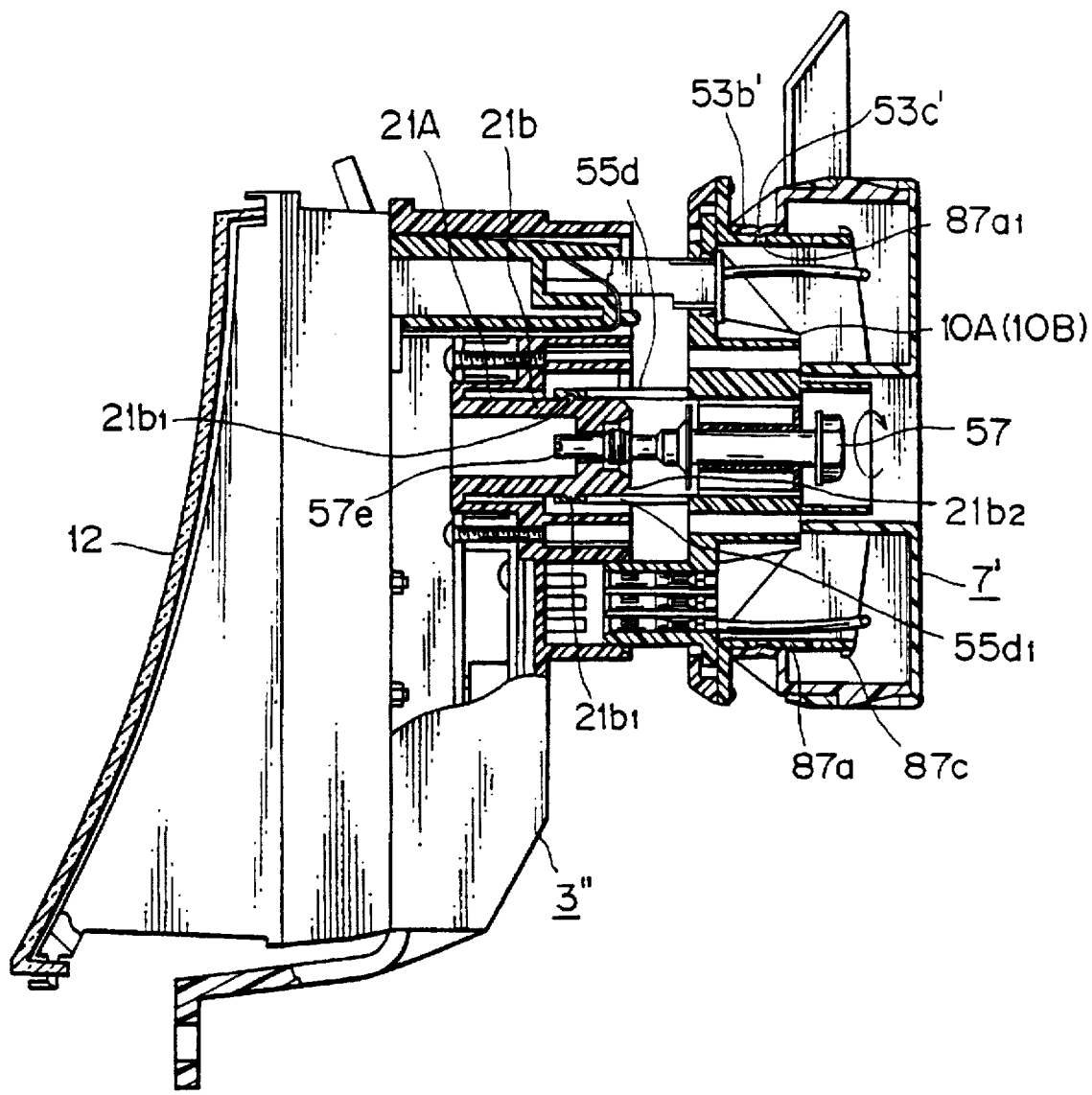
FIG. 32 is a cross sectional view to show an assembling step of the wiring harness protector and the meter module as shown in FIG. 27.

In more detail, as shown in FIGS. 27 and 32, the bolt fitting portion $55d$ of the A side multipolar connector 10A is lightly fit in the bolt receiving portion $21b$ of in-pane harness connection connector 21A in the meter module 3" so as to engage the stop holes $55d_1$ of the bolt fitting portion $55d$ with the semispherical stop projections $21b_1$ provided on the bolt receiving portion $21b$, thus effecting the temporary fixation.

Even if the B side multipolar connector 10B has a positional deviation relative to the corresponding connector on that occasion, it is automatically self-centered by catch at the peripheral taper $21b_2$ of bolt receiving portion $21b$ and the slide mechanism as shown in FIGS. 31A and 31B, thus effecting temporary fixation in the same manner as the multipolar connector 10A.

In case of the above positional deviation being relatively large, one can manually move the multipolar connector 10B vertically or horizontally up to a position where it can be caught by the taper $21b_2$.

Figure 33:
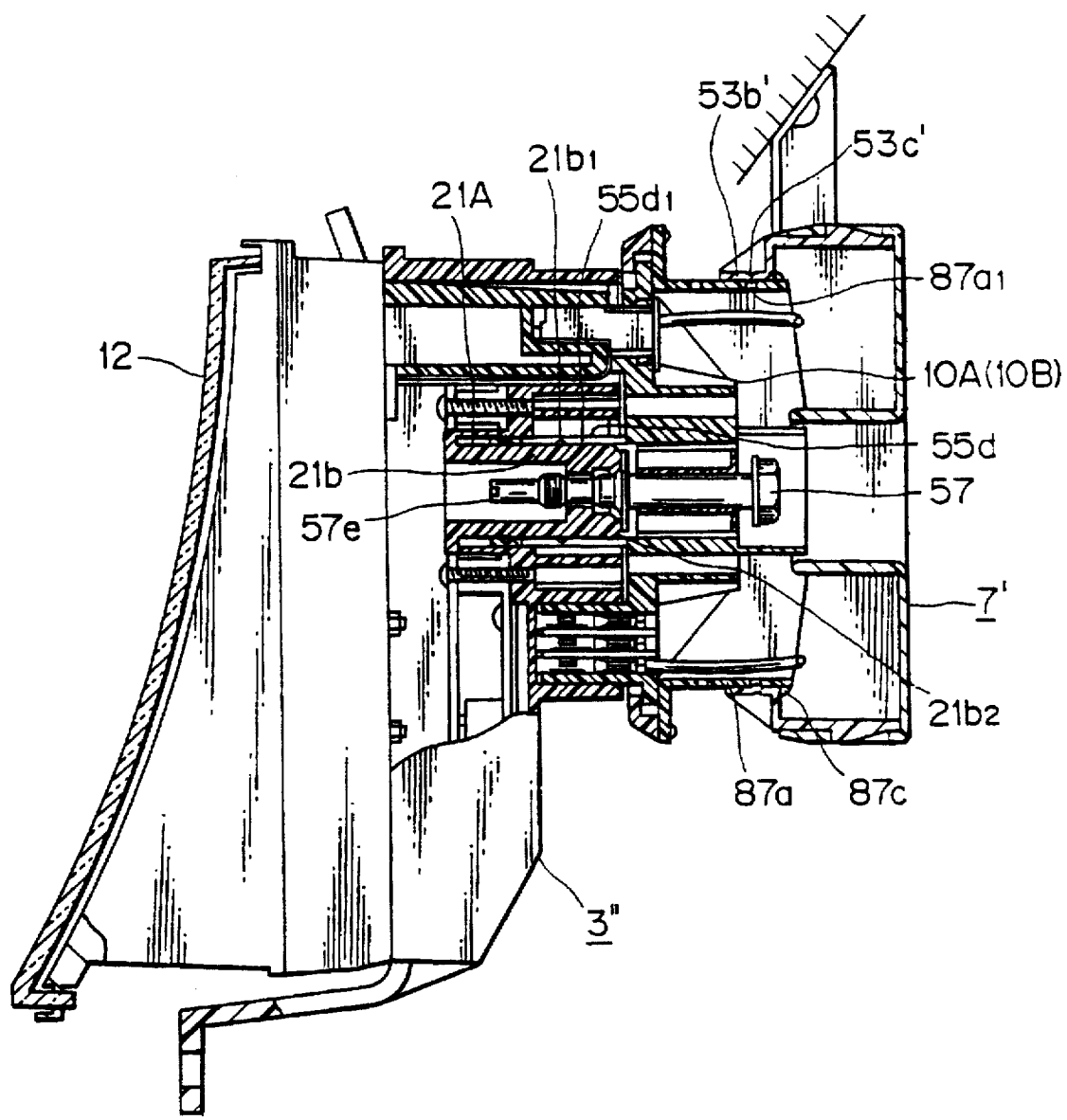
FIG. 33 is a cross sectional view to show an assembled state of the wiring harness protector and the meter module as shown in FIG. 32.

The tentative fixation of the multipolar connectors 10A, 10B means that the entire protector 7' is tentatively fixed on the meter module 3". Then rotating the bolt 57 as shown in FIG. 33, the multipolar connector 10A (10B) advances along the guide frame $53b'$ of protector 7' to complete electric connection with a corresponding harness connection connector 21A (21B). Since the multipolar connectors 10A, 10B are arranged as movable independent of each other, no excessive force will be exerted on one of connectors during screwing the other.

When the meter panel 12 is taken out for maintenance in FIG. 33, the tool t (see FIG. 29) can be made to fit with the engagement end $57e$ at the fore end of bolt 57 in the multipolar connector 10A (10B). Then, inversely rotating the bolt 57, the connection between the multipolar connector 10A (10B) and the in-pane harness connection connector 21 of meter module 3" can be released from the front side. Accordingly, the entire meter module 3" can be readily removed by pulling back only the multipolar connectors 10A, 10B without moving the wire harness protector 7' as fixed on the instrument panel.

In re-assembling the meter module 3", it can be also readily mounted as described above because the two connectors 10A, 10B are movable.

Figure 34:
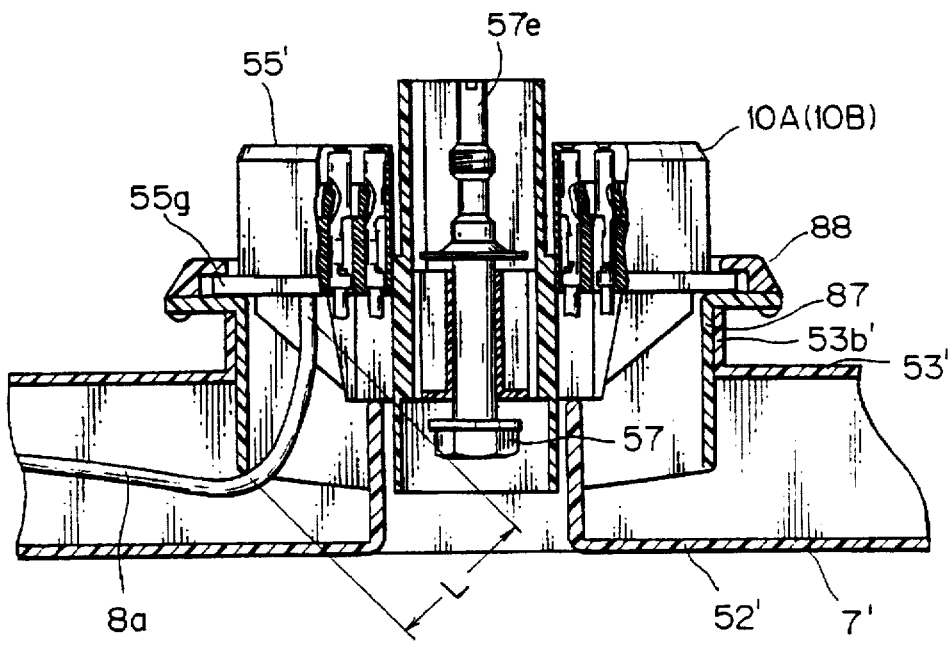
FIG. 34 is an explanatory drawing of operation to show a behavior of a cable in wiring harness protector with a motion of multipolar connector 10A.
Figure 35:
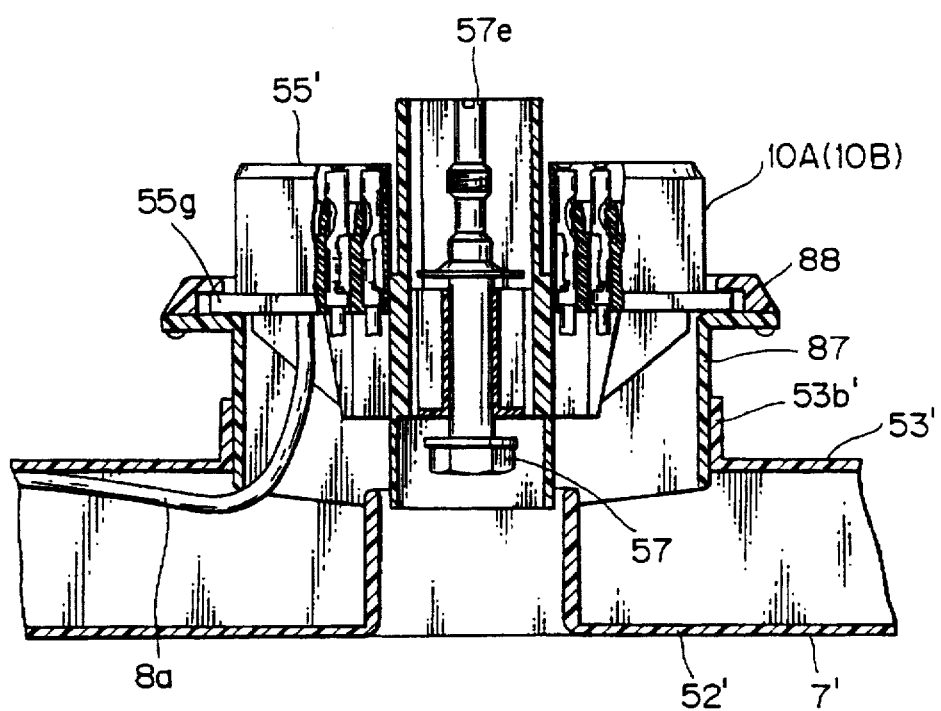
FIG. 35 is an explanatory drawing of operation to show a state caused with advance of the multipolar connector 10A as shown in FIG. 34.

Since the multipolar connector 10A is slidable relative to the protector 7' by the slide magazine (contact holder 87 and holder cover 88), as shown in FIG. 34 and FIG. 35, a portion of certain length L in an internal cable $8a$ is always inside the connector holder 87 and moves together therewith, whereby no tension is exerted on the connector itself, which can prevent terminal slit-off.

The above description concerns an example in which two multipolar connectors 10A, 10B are arranged as movable back and forth and vertically and horizontally on the protector 7'. However, since one multipolar connector 10A can be selected as the reference as being a fixed connector, the multipolar connector 10A may be arranged as only movable back and forth but fixed in the vertical and horizontal directions.

As described above, at least one of multipolar connectors 10A, 10B is so arranged as movable in the vertical and horizontal directions relative to the protector 7', which requires no precise positioning in assembling between the protector 7' and meter module 3', improving assembling easiness. Also, the multipolar connectors 10A, 10B are arranged as slidable relative to the protector 7', so that the protector 7' is stationary in maintenance and the reproducibility is high, improving the reliability of connection. Considering the assembling accuracy between the meter module 3" and the instrument panel, it is understood that in case of a single multipolar connector 10 being provided on the protector 7 as shown in FIG. 4, the multipolar connector is preferably arranged as movable. Further, since the tension is small on the cable $8a$ and the resin (flange $55g$) has a low resistance to slip, the vertical and horizontal motion of multipolar connectors 10A, 10B is smooth, making automatic assembling of protector 7' onto the meter module 3" possible.

The meter module of the present invention intensively incorporates the meter panel in which the meters, and indication lamps, and drive circuits therefor are mounted, the centralized control circuit board in which the control circuits of electric devices including the meters and indication lamps as set, and the electric junction box for distribution of power supply to the electric devices and input and output signals and for integration of earth lines, using the module case. Therefore, the meter module can match a change in type of car or grade, or an addition of electric device. Also, the meter module can greatly simplify the wiring arrangement around the instrument panel portion. Further, the wiring and assembling can be carried out easily. Thus, productivity of cars can be improved and the production cost can be reduced. Also, the shield member is interposed between the centralized control circuit board and the electric junction box, so that the centralized control circuit board is free of negative effect due to the heating or electromagnetic waves produced in the electric junction box upon use of load.

Also, the wiring harness protector and the connecting device of instrument panel harness of the present invention can greatly simplify the wiring harness, especially the wiring arrangement of instrument panel harness around the instrument panel portion where a number of electric devices are concentrated. The wiring and assembling are easy. Thus, the productivity of cars can be improved and the production cost can be reduced. In case a plurality of multipolar connectors are provided in the wiring harness protector, at least one of them is arranged as movable, whereby the connector can be easily fit in with the corresponding connector to be easily connected therewith.

Many widely different embodiments of the present invention may be constructed without departing from the spirit and scope of the present invention. It should be understood that the present invention is not limited to the specific embodiments described in the specification.

What is claimed is:

1. A wiring harness protector (7) for simplifying the wiring arrangement of a wiring harness (8) and for facilitating the setting and assembling of said wiring harness (8), said protector (7) comprising:

a means for protecting a wiring harness (8) therein and a cover (53) thereof, wherein said protecting means is a protector main body (52) that has engaging holes (52a) and stopper holes (52c) which mate with engaging pawls (53a) of said cover (53) and stoppers (55c) of a first connector (55), respectively, to hold said cover (53) in place with respect to said protector main body (52);

wherein a plurality of through holes (53b) are concentrated in said cover (53);

wherein said first connector (55) and at least a second connector (56) in said wiring harness (8) set in said protector main body (52) are set through said corresponding through holes (53b) in a direction perpendicular to an extending direction of said wiring harness (8);

wherein said first and second connectors (55,56) are fixed by a connector stopper (54) to thereby form a multipolar connector (10); and wherein a bolt (57) is set in said first connector (55) so that said bolt (57) protrudes outside of said protector (7) through an opening (52b) in said protector main body (52) in order for said bolt (57) to be accessible without disassembly of said protector (7).

2. The wiring harness protector (7) according to claim 1, wherein a plurality of multipolar connectors (10A, 10B) are formed in said cover (53), one of said plurality of multipolar connectors (10A, 10B) being fixed to said cover (53) and the other multipolar connectors being arranged movable relative to a surface of said cover (53) in directions parallel to said surface of said cover (53).

3. The wiring harness protector (7) according to claim 2, wherein said plurality of multipolar connectors (10A, 10B) are two multipolar connectors (10A, 10B).

4. The wiring harness protector (7) according to claim 1, wherein a plurality of multipolar connectors (10A, 10B) are formed in said cover (53), all of said plurality of multipolar connectors (10A, 10B) being arranged movable relative to a surface of said cover (53) in directions parallel to said surface of said cover (53).

5. The wiring harness protector (7) according to claim 4, wherein said plurality of multipolar connectors (10A, 10B) are arranged slidable back and forth relative to said surface of said cover (53).

6. The wiring harness protector (7) according to claim 1, wherein said wiring harness (8) is an instrument panel wiring harness (8) having a plurality of connectors to be connected to various electric devices comprising a meter panel (12) set in an instrument panel portion of a vehicle (1), a centralized control circuit board (14) in which control circuits (4) for electrical devices ($4_1$, $4_2$, $4_3$, $4_4$, $4_5$, $4_6$) of said vehicle comprising meters (35) and indication lamps (42) in said meter panel (12) are installed, and a main electric junction box ($4_1$) for distribution of power supply, input and output signals to said electrical devices ($4_1$, $4_2$, $4_3$, $4_4$, $4_5$, $4_6$) of said vehicle and for integration of earth lines.

7. The wiring harness protector (7) according to claim 6, further comprising an instrument panel wiring harness connection connector (41) connected to a printed-wiring board (13) set on a back face of said meter panel (12), said instrument panel wiring harness connection connector (41) has a housing (56a) with an internal side wall thereof being open and with an elastic contact piece (58a) of a connector terminal (58) being exposed to an opening portion, and a surface of said elastic contact piece (58a) contacts a circuit connection portion (40) of said printed-wiring board (14).

8. A connecting device for connection between electric devices ($4_1$, $4_2$, $4_3$, $4_4$, $4_5$, $4_6$) and an instrument panel wiring harness (8) having a plurality of connectors (55, 56) to be connected with said electric devices ($4_1$, $4_2$, $4_3$, $4_4$, $4_5$, $4_6$), said electric devices ($4_1$, $4_2$, $4_3$, $4_4$, $4_5$, $4_6$) including a meter panel (12) set in a portion of an instrument panel (2) of a vehicle (1), a centralized control circuit board (14) in which control circuits (4) for said electric devices ($4_1$, $4_2$, $4_3$, $4_4$, $4_5$, $4_6$) of said vehicle (1) comprise meters (35) and indication lamps (42) in said meter panel (12) are installed, and a main electric junction box (9) for distribution of power supply, input and output signals to said electric devices ($4_1$, $4_2$, $4_3$, $4_4$, $4_5$, $4_6$) of said vehicle (1) and for integration of earth lines;

wherein said connecting device has a wiring harness protector (7) comprising a protector main body (52) and a cover (53) thereof, said protector main body (52) having engaging holes (52a) and stopper holes (52c) which mate with engaging pawls (53a) of said cover (53) and stoppers (55c) of said connector 55, respectively, to hold said cover (53) in place with respect to said protector main body (52), said cover

(53) having a plurality of through holes (53b) which are concentrated therein, said plurality of connectors (55, 56) in said instrument panel wiring harness (8) are set through said corresponding through holes (53b) in a direction perpendicular to an extending direction of said instrument panel wiring harness (8), and said connectors (55,56) are fixed by a connector stopper (54) to form a multipolar connector (10);

wherein said main electric junction box (9) and said centralized control circuit board (14) are intensively incorporated in a module case (16) to form a meter module (3), and said module case (16) is provided with instrument panel wiring harness connection connectors (41) intensively arranged corresponding to said plurality of connectors (55, 56) constituting said multipolar connector (10); and wherein a bolt (57) is set in said connector (55) so that said bolt (57) protrudes outside of said protector (7) through an opening (52b) in said protector main body (52) in order for said bolt (57) to be accessible without disassembly of said protector (7).

* * * * *